(12) United States Patent
Perkins

(10) Patent No.: US 10,960,588 B2
(45) Date of Patent: Mar. 30, 2021

(54) SYSTEM AND METHOD FOR APPLYING MOLDABLE MATERIAL TO A PIPE

(71) Applicant: INA ACQUISITION CORP., Wilmington, DE (US)

(72) Inventor: Randall Perkins, Houston, TX (US)

(73) Assignee: Bayou HoldCo, Inc., New Iberia, LA (US)

( * ) Notice: Subject to any disclaimer, the term of this patent is extended or adjusted under 35 U.S.C. 154(b) by 229 days.

(21) Appl. No.: 15/177,066

(22) Filed: Jun. 8, 2016

(65) Prior Publication Data

US 2017/0355114 A1 Dec. 14, 2017

(51) Int. Cl.
| | | |
|---|---|---|
| *B29C 45/14* | (2006.01) | |
| *B29C 45/00* | (2006.01) | |
| *B29C 45/26* | (2006.01) | |
| *B29C 45/34* | (2006.01) | |
| *B29C 45/80* | (2006.01) | |
| *B29K 75/00* | (2006.01) | |

(Continued)

(52) U.S. Cl.
CPC .... *B29C 45/14598* (2013.01); *B29C 45/0046* (2013.01); *B29C 45/14622* (2013.01); *B29C 45/261* (2013.01); *B29C 45/34* (2013.01); *B29C 45/80* (2013.01); *B29C 2945/76568* (2013.01); *B29K 2075/00* (2013.01); *B29K 2705/00* (2013.01); *B29L 2023/22* (2013.01)

(58) Field of Classification Search
CPC .......... B29C 45/14598; B29C 45/0046; B29C 45/14622; B29C 45/261; B29C 45/34; B29C 53/82; B29C 45/00; B29C 33/10; B29C 44/588; B29C 45/345; F16L 1/12; B23P 6/00

USPC ....... 264/259; 156/425; 405/166; 29/402.09; 425/192

See application file for complete search history.

(56) References Cited

U.S. PATENT DOCUMENTS

| | | | |
|---|---|---|---|
| 2,053,307 A | | 9/1936 | Wilson |
| 3,359,351 A | * | 12/1967 | Bender .................. F16L 59/22 |
| | | | 264/46.9 |

(Continued)

FOREIGN PATENT DOCUMENTS

| | | |
|---|---|---|
| DE | 10314032 A1 | 10/2004 |
| DE | 102011009333 A1 | 7/2012 |

(Continued)

*Primary Examiner* — Matthew J Daniels
*Assistant Examiner* — Yunju Kim
(74) *Attorney, Agent, or Firm* — Stinson LLP

(57) ABSTRACT

A molding system for applying moldable material to a pipe. An elongate mold has at least one elongate mold member movable relative another elongate mold member between open and closed positions. In the closed position, the mold may define an elongate vent between the mold members that extends along the longitudinal axis of the mold. Air in the mold cavity displaced by moldable material received into the mold cavity vents through the elongate vent along the longitudinal axis of the mold. The mold can include a positioner that positions the mold members in the closed position while the mold is filled with the moldable material. The positioner also allows movement of the first mold member toward the open position to partially open the mold as the moldable material cures to reduce forces imparted upon the mold due to expansion of the moldable material during curing.

27 Claims, 17 Drawing Sheets

(51) Int. Cl.
*B29K 705/00* (2006.01)
*B29L 23/00* (2006.01)

(56) References Cited

U.S. PATENT DOCUMENTS

| | | | |
|---|---|---|---|
| 3,718,309 A | 2/1973 | Harris | |
| 3,889,919 A * | 6/1975 | Ladney, Jr. | B29C 33/10 249/141 |
| 3,929,166 A | 12/1975 | Westerheid | |
| 3,948,292 A | 4/1976 | Goto et al. | |
| 4,522,578 A | 6/1985 | Martin, Jr. et al. | |
| 4,909,972 A * | 3/1990 | Britz | B29C 44/1238 152/112 |
| 5,356,580 A * | 10/1994 | Clark | B29C 33/10 264/276 |
| 5,491,880 A * | 2/1996 | Labiche | B29C 63/10 156/282 |
| 5,662,841 A * | 9/1997 | Guergov | B22D 17/10 264/328.1 |
| 5,817,347 A * | 10/1998 | Tamcsin | B29C 33/0038 264/328.2 |
| 6,058,979 A | 5/2000 | Watkins | |
| 6,199,593 B1 | 3/2001 | Schmiade | |
| 6,827,110 B2 | 12/2004 | Watkins | |
| 7,195,730 B2 | 3/2007 | Calderoni et al. | |
| 8,950,071 B2 | 2/2015 | Knecht | |
| 2006/0032588 A1 * | 2/2006 | Appleby | B29C 44/324 156/425 |
| 2007/0182071 A1 * | 8/2007 | Sekido | B29C 33/0066 264/511 |
| 2013/0170913 A1 * | 7/2013 | Hoffmann | B29C 45/04 405/166 |
| 2013/0185923 A1 | 7/2013 | Jensen | |
| 2015/0044320 A1 | 2/2015 | George et al. | |
| 2016/0243736 A1 | 8/2016 | Stier | |

FOREIGN PATENT DOCUMENTS

| | | | |
|---|---|---|---|
| EP | 2305443 A1 | 6/2011 | |
| GB | 1220349 * | 1/1971 | B29C 33/00 |
| GB | 2234570 A | 6/1991 | |
| WO | WO200047387 | 8/2000 | |
| WO | WO2004024411 A1 | 3/2004 | |
| WO | WO2009109776 A2 | 9/2009 | |

* cited by examiner

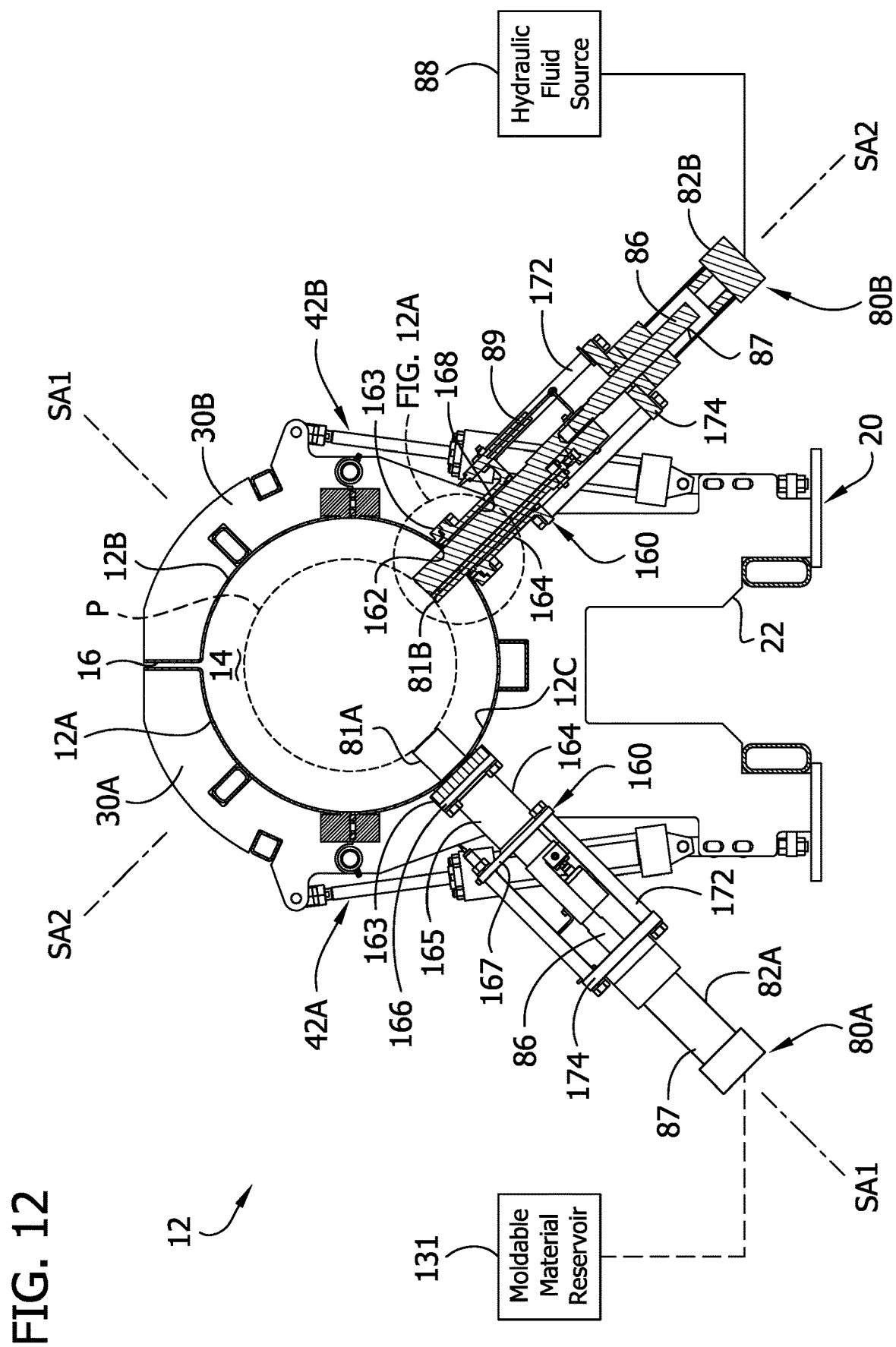

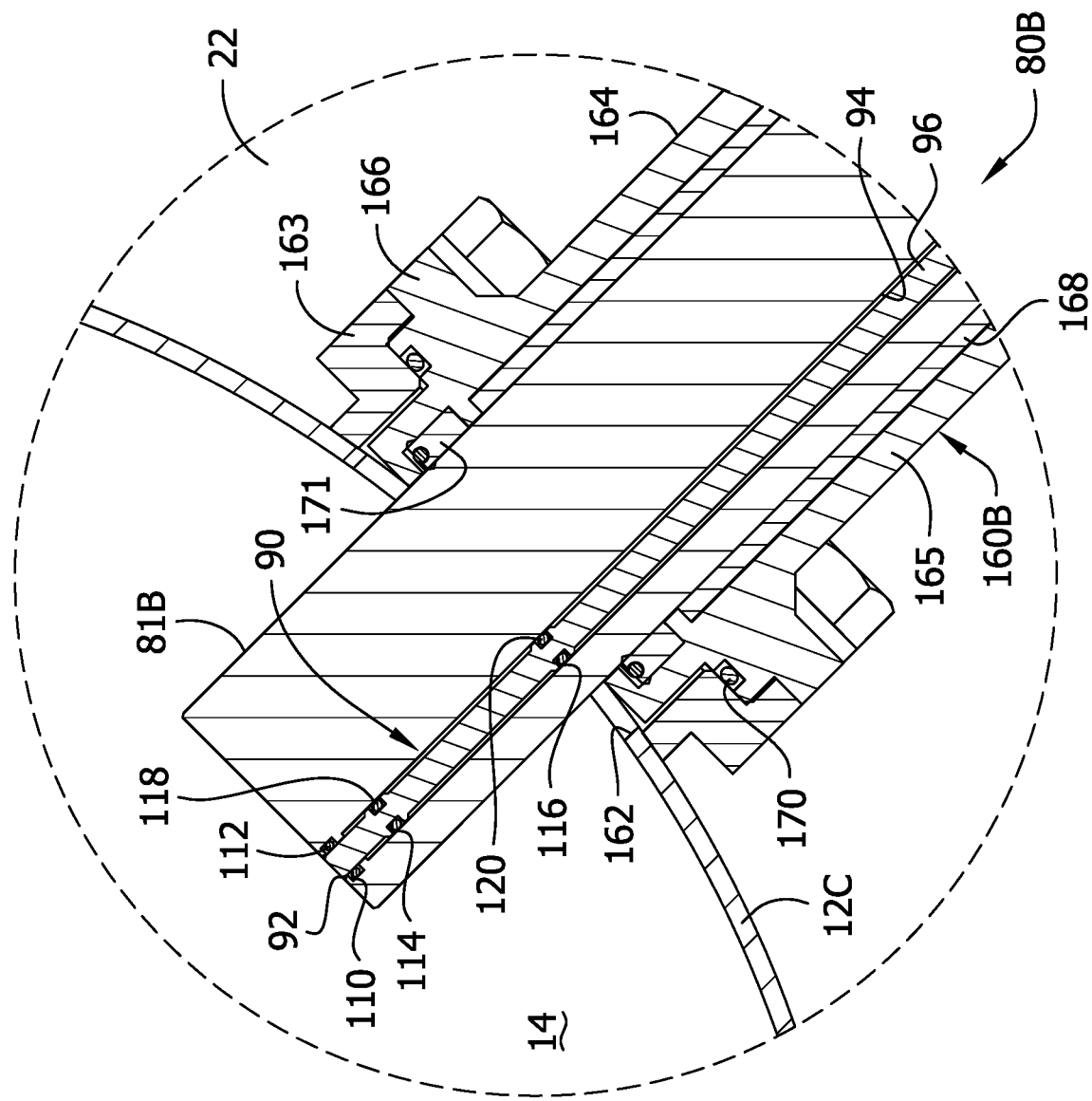

SYSTEM AND METHOD FOR APPLYING MOLDABLE MATERIAL TO A PIPE

FIELD

The present disclosure generally relates to a molding system for applying moldable material to a pipe.

BACKGROUND

Metal pipes are often insulated to withstand harsh operating conditions. For example, pipes can be insulated in an injection molding process prior to deployment. Injection molded insulated pipes can be used, for example, in subsea oil and gas pipelines or risers. Some subsea oil and gas exploration environments, such as those of the Norphlet play, require pipes that can withstand temperatures of 350° F. or more.

SUMMARY

In one aspect, a molding system for applying a moldable material to a pipe comprises a mold having first and second end portions spaced apart along a longitudinal axis of the mold. The mold defines a mold cavity for receiving the pipe therein so that the pipe extends generally along the longitudinal axis of the mold. The mold has an open position in which the mold cavity is open for passing the pipe into and out of the mold cavity and a closed position in which the pipe cannot pass into or out of the mold cavity. A support is configured to hold a pipe in the mold cavity so that an annular portion of the mold cavity extends circumferentially around the pipe in the closed position of the mold. An elongate vent is defined by the mold in the closed position and provides fluid communication between the mold cavity and the atmosphere outside of the mold so that air in the mold cavity displaced by moldable material received into the mold cavity vents through the elongate vent along the longitudinal axis of the mold.

In another aspect, a method of applying a moldable material to a pipe comprises placing the pipe within a mold so that the pipe extends generally along a longitudinal axis of the mold within a mold cavity and an annular portion of the mold cavity extends circumferentially around the pipe. The annular portion of the mold cavity is filled with the moldable material so that the mold cavity fills from a bottom toward the top of the mold cavity. During said step of filling the mold cavity, air displaced by moldable material in the mold cavity is vented radially outwardly from the mold at plural locations along the longitudinal axis of the mold through an elongate vent extending generally along the longitudinal axis of the mold adjacent the top of the mold cavity.

In another aspect, a molding system for applying a moldable material to a pipe comprises a mold having a longitudinal axis and defining a mold cavity for receiving the pipe therein so that the pipe extends generally along the longitudinal axis of the mold. The mold includes first and second elongate mold members extending along the longitudinal axis of the mold. At least the first mold member is movable relative to the second mold member between an open position and a closed position to selectively open and close the mold. A positioner is operatively connected to the first mold member to move the first mold member between the open and closed positions. The positioner is configured to position the first mold member in the closed position while the mold is filled with the moldable material and to allow movement of the first mold member toward the open position to partially open the mold as the moldable material cures to reduce forces imparted upon the mold due to expansion of the moldable material during curing.

In another aspect, a method of applying a moldable material to a pipe comprises placing the pipe within a mold so that the pipe extends generally along a longitudinal axis of the mold within a mold cavity and so that an annular portion of the mold cavity extends circumferentially around the pipe. The annular portion of the mold cavity is filled with moldable material. The moldable material is cured. The moldable material expands during said curing. The mold is partially opened during curing to reduce forces imparted on the mold as the moldable material expands.

Other objects and features will be in part apparent and in part pointed out hereinafter.

BRIEF DESCRIPTION OF THE DRAWINGS

FIG. 12 is a section taken in the plane of line 12-12 of FIG. 2;

FIG. 12A is an enlarged view of a portion of FIG. 12;

Corresponding reference characters indicate corresponding parts throughout the drawings.

DETAILED DESCRIPTION

Figure 1:
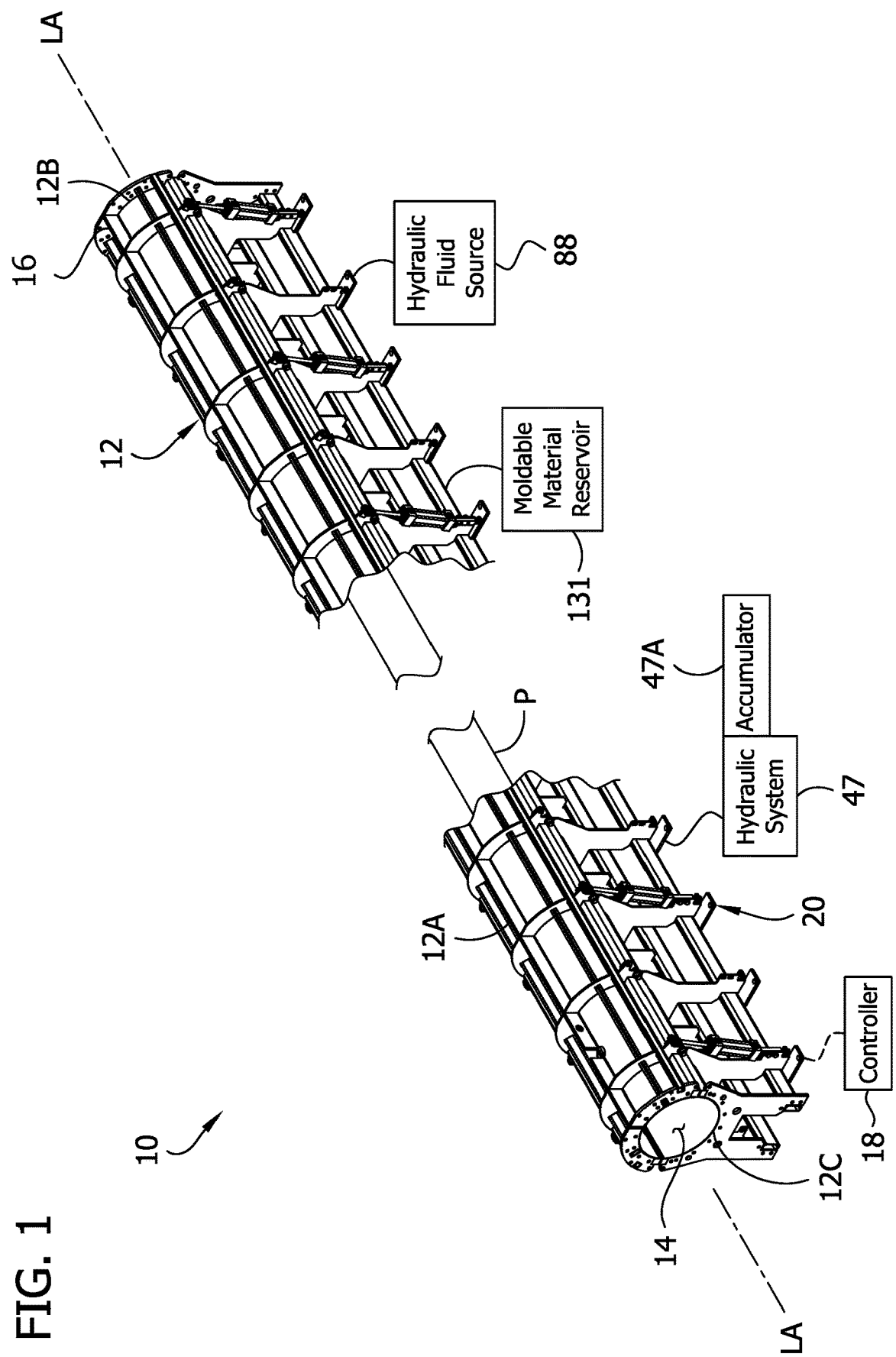
FIG. 1 is a fragmentary perspective of a mold of a molding system, illustrating a controller, a nitrogen reservoir, an hydraulic reservoir, and a moldable material reservoir of the molding system schematically.
Figure 2:
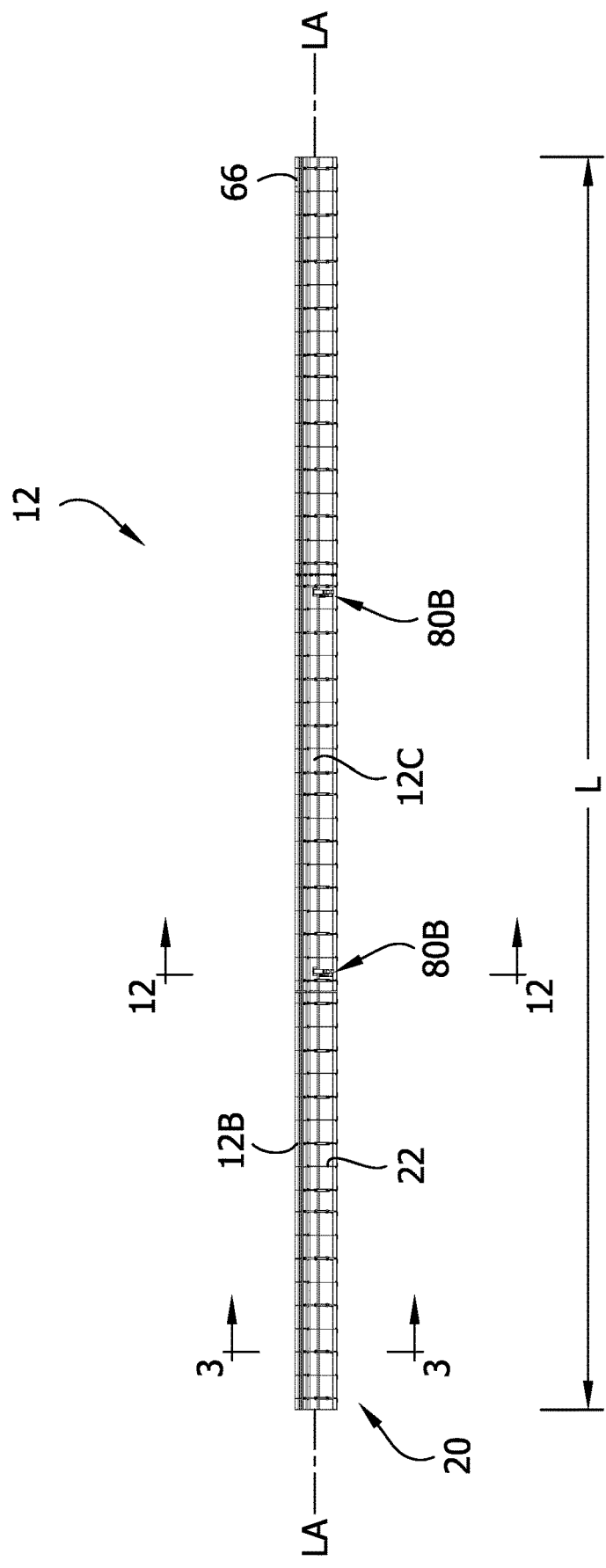
FIG. 2 is a side elevation of the mold.

Referring to FIGS. 1 and 2, a molding system for applying moldable material, such as insulation, to a pipe P is generally indicated at reference number 10. Suitably, the molding system 10 may be configured to form an insulated pipe for use under rigorous conditions (e.g., high temperature conditions, high pressure conditions, etc.). In certain exemplary embodiments, the molding system 10 applies a coating to a metal pipe P to insulate the pipe for use as pipe segment in a subsea oil riser or pipeline. Exemplary moldable materials for such applications include, for example, norbornene monomers with Grubb's catalyst, glass syntactic polyurethanes, and polyurethanes.

Figure 3:
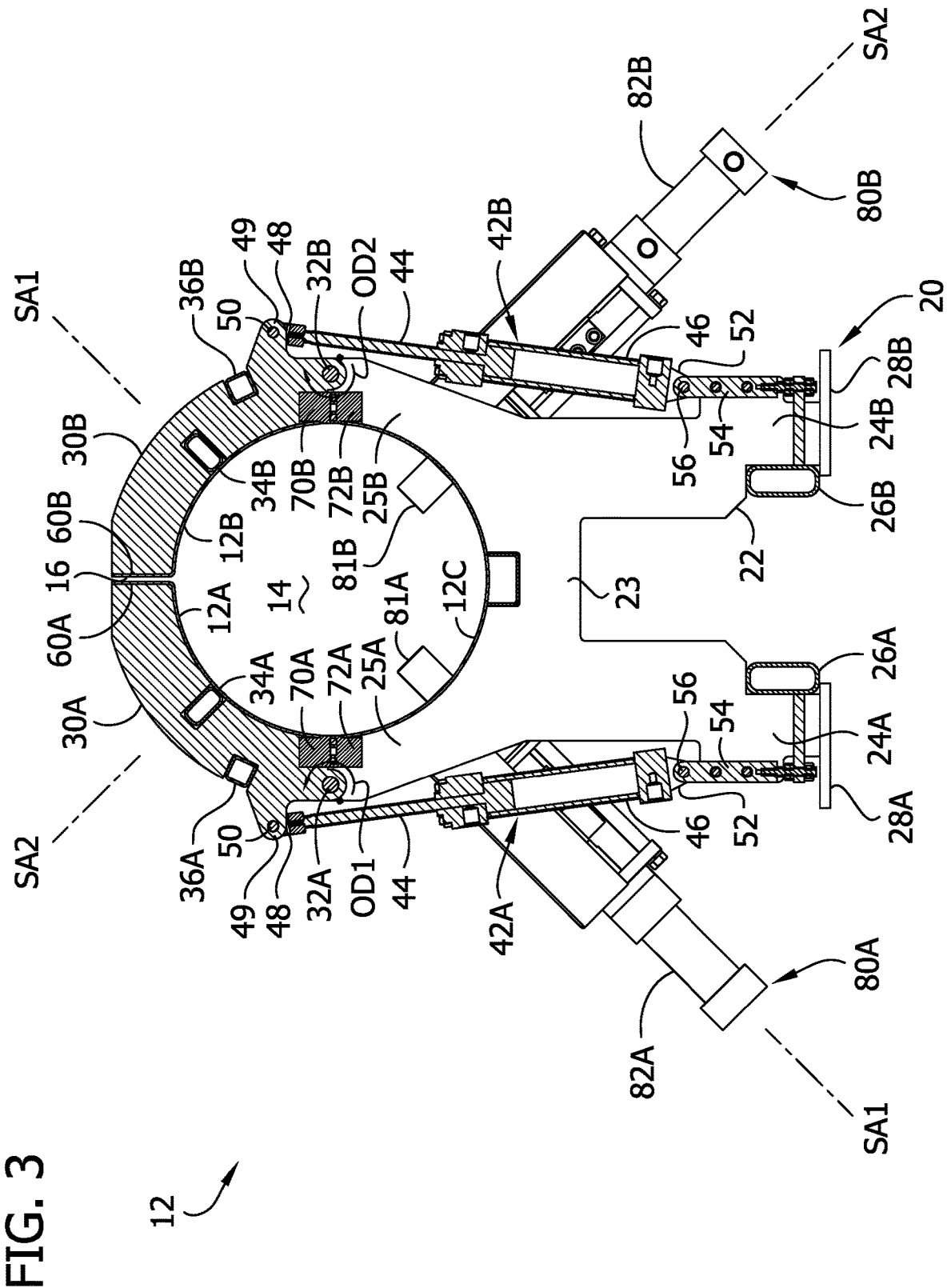
FIG. 3 is a section taken in the plane of line 3-3 of FIG. 2, illustrating the mold in a closed position.
Figure 4:
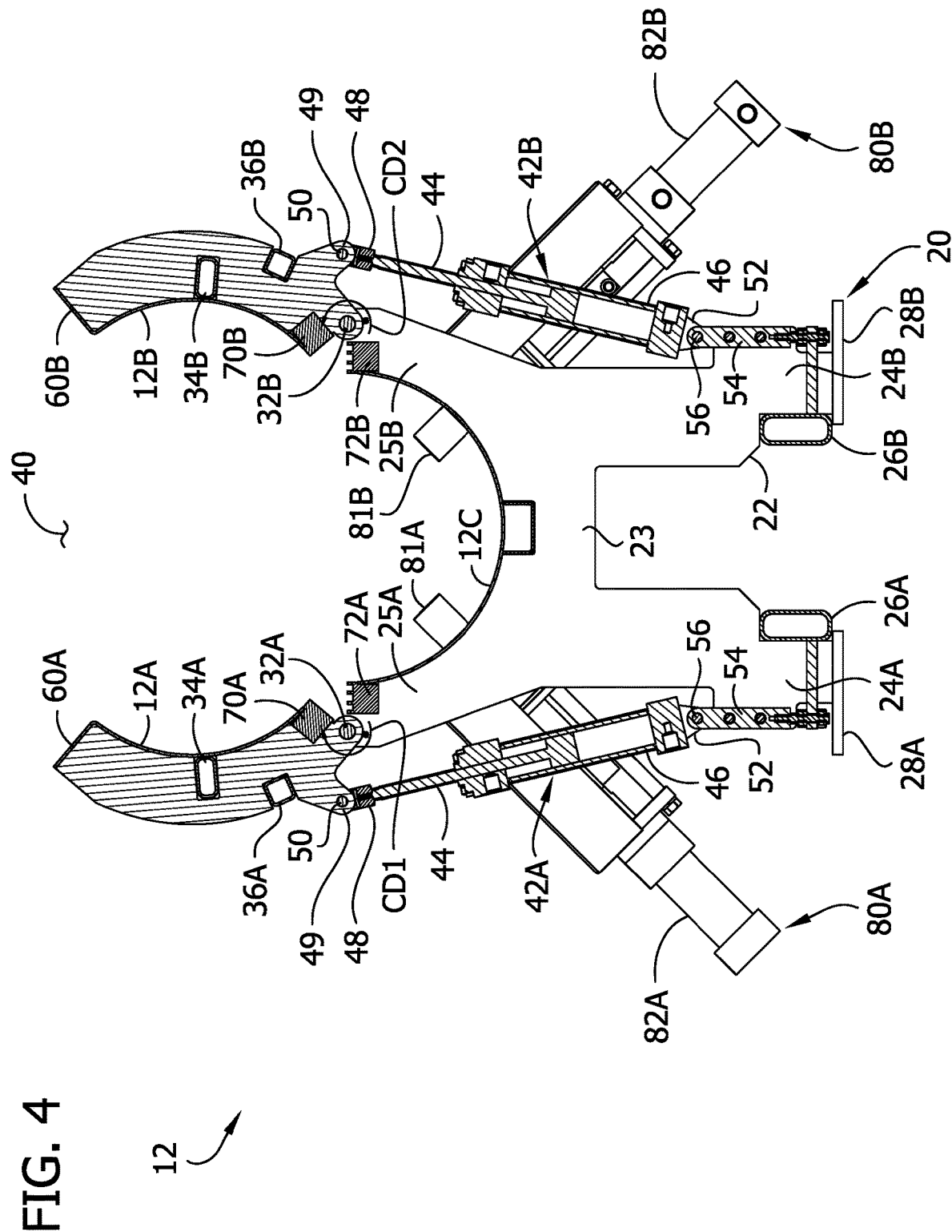
FIG. 4 is a section similar to FIG. 3, illustrating the mold in an open position.

The molding system 10 includes a mold 12 that is selectively movable between a closed position (FIG. 3) and an open position (FIG. 4). In the closed position, the mold 12 defines a mold cavity 14 shaped and arranged for receiving the pipe P therein. The mold 12 has a first end portion and a second end portion that is spaced apart from the first end portion along a longitudinal axis LA of the mold. A length L of the mold 12 extends along the longitudinal axis LA from the first end portion to the second end portion. In one or more embodiments, the length L is greater than 45 feet, such as greater than about 75 feet (e.g., about 80 feet or about 84 feet, etc.). One skilled in the art will appreciate that these lengths exceed the lengths of conventional molding systems, which enables the illustrated molding system 10 to be used to apply moldable material to longer pipes P than conventional molding systems (e.g., pipes of at least about 45 feet, at least about 75 feet, about 80 feet, etc.). It will be understood that molding systems of other lengths may be used to apply moldable material to pipes of other lengths without departing from the scope of the invention.

As explained below, the molding system 12 includes a dynamic support mechanism for maintaining the pipe P in a molding position within the mold cavity 14 along its entire length, while also ensuring uniform application of the moldable material to the exterior of the pipe. The molding system 10 also includes an elongate vent 16 (FIG. 3) that allows the mold cavity 14 to be filled in a horizontal orientation, instead of a vertical or sloped orientation. In addition, the molding system 10 includes a controller 18 configured to partially open the mold 12 during curing to relieve stresses imparted on the mold by the exothermic expansion of the moldable material enclosed in the mold. In FIG. 1, the controller 18 and the connection between the controller and the mold 12 are illustrated schematically. It will be understood that the schematic illustration represents one or more control modules configured to control various controllable aspects of the molding system 10. In the illustrated molding system 10, these features aid in uniformly applying the moldable material to the pipe P along its entire (relatively long) length. It will be understood that these same features can be used with other molding systems to apply moldable material to pipes of other lengths.

Figure 5:
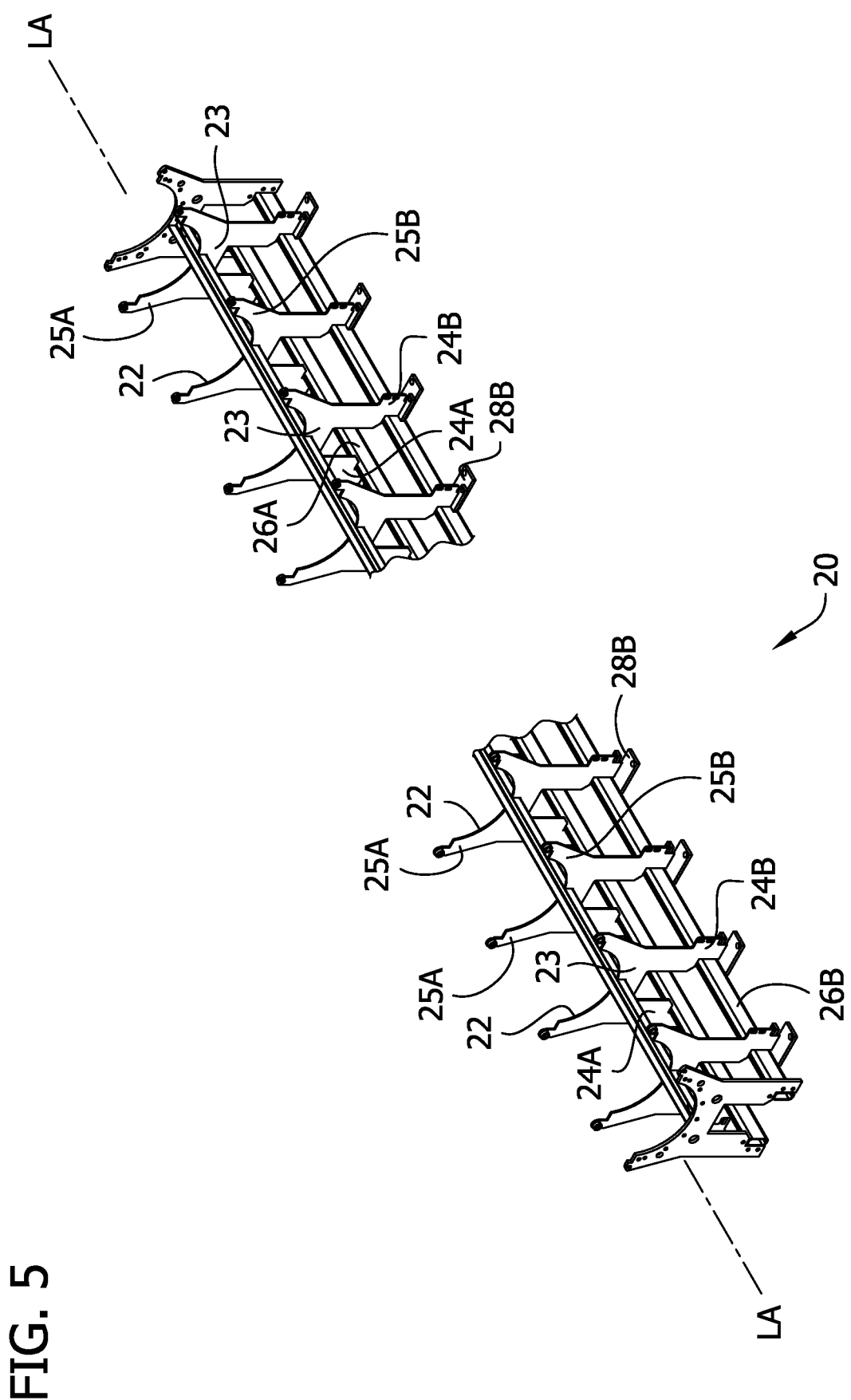
FIG. 5 is a fragmentary perspective of a base of the mold.
Figure 6:
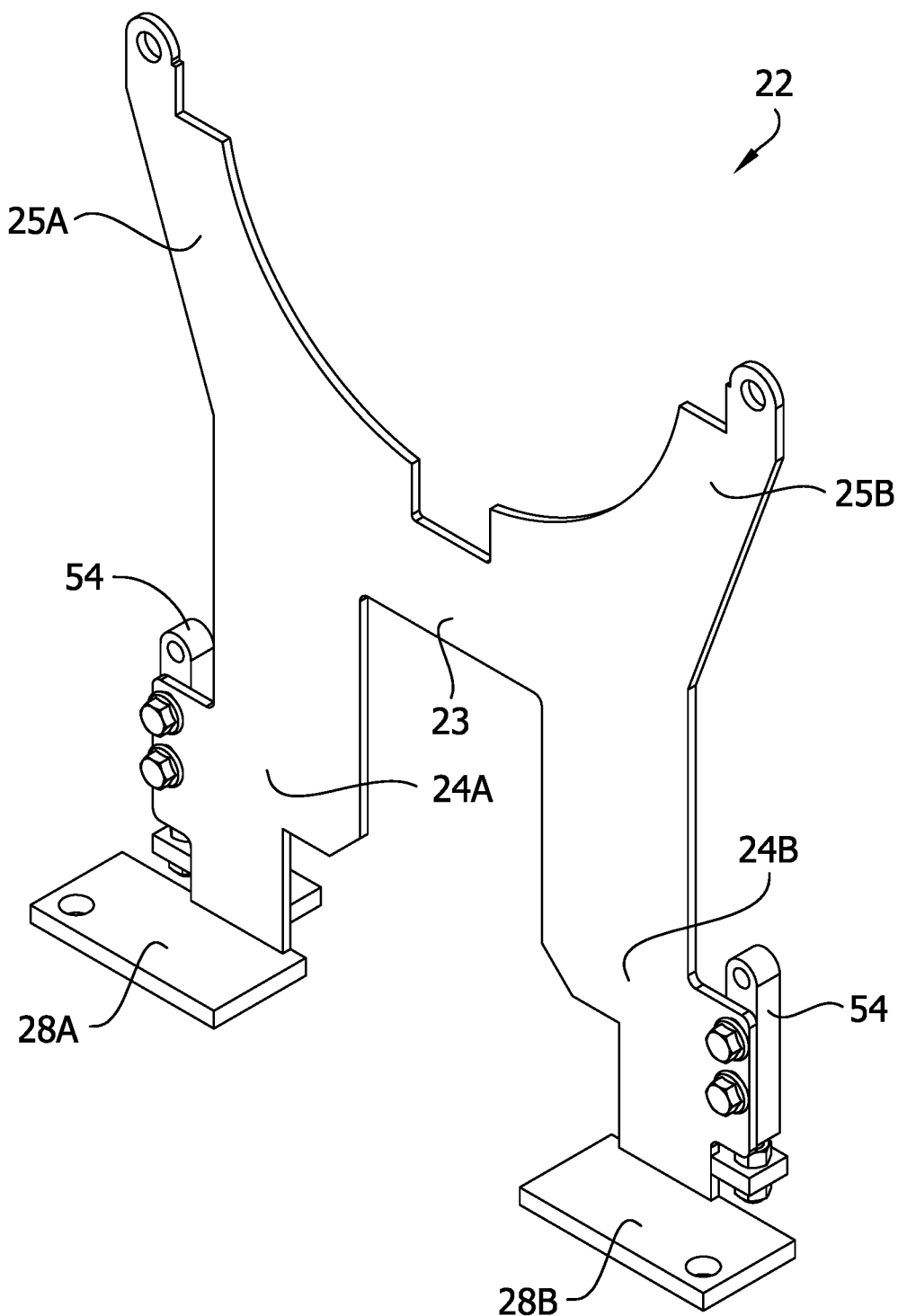
FIG. 6 is a perspective of a base bracket of the base.
Figure 7:
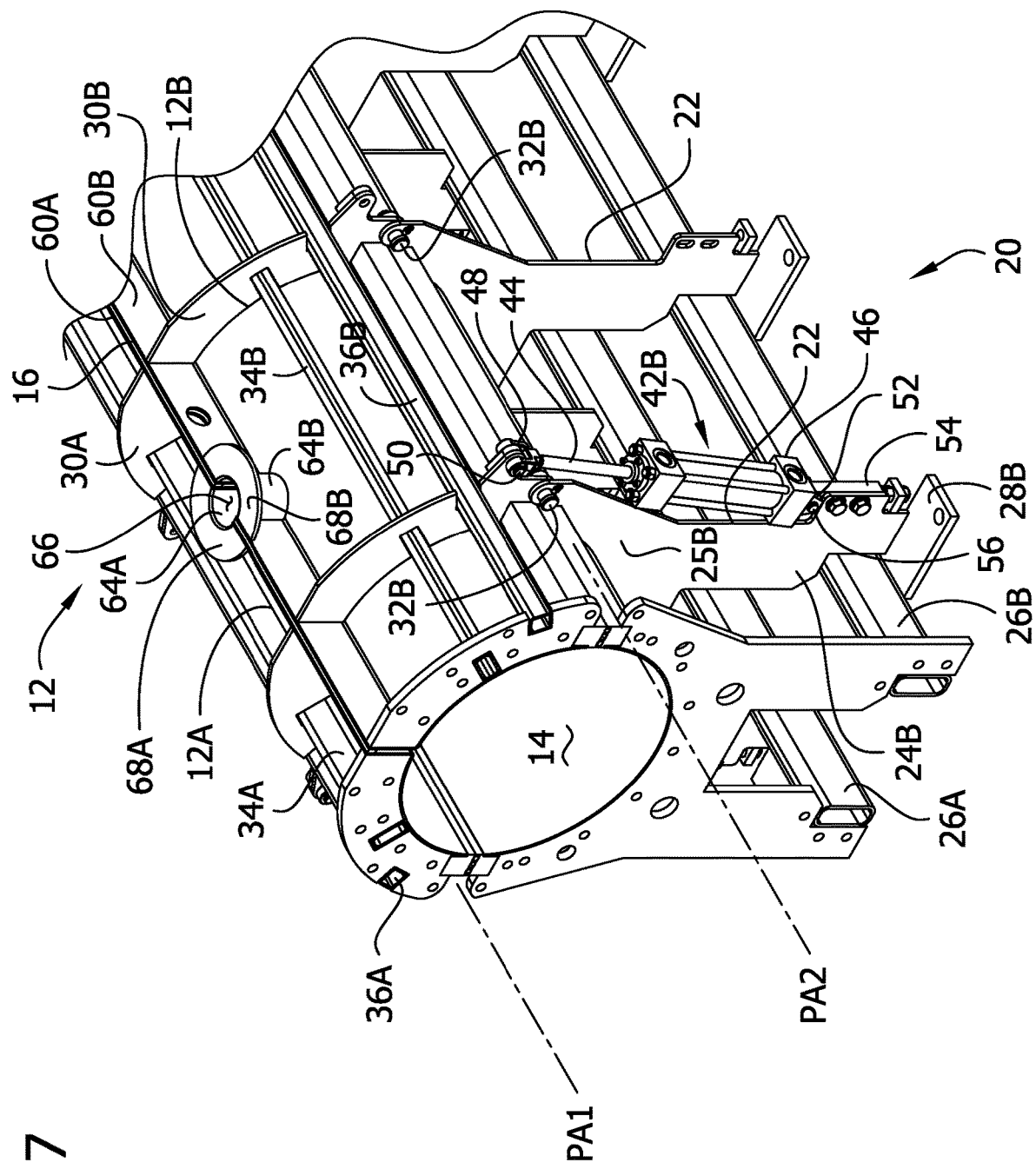
FIG. 7 is an enlarged fragmentary perspective of an end portion of the mold.

Referring to FIGS. 5-7, the mold 12 is mounted on a base 20. The illustrated base 20 includes a plurality of base brackets 22 that are spaced apart along the length L of the mold 12. Each base bracket 22 comprises a metal plate, and the base brackets 22 all have substantially identical shape. The base brackets 22 each have a waist portion 23, first and second leg portions 24A, 24B that are spaced apart from one another and extend downward from the waist portion, and first and arm portions 25A, 25B that are spaced apart from one another and extend upward from the waist portion. Each of the leg portions 22A is attached to a support beam 26A that extends the length L of the mold 12, and each of the leg portions 22B is attached to other support beams 26B that extend the length of the mold. The support beams 26A, 26B fix the base brackets 22 in spaced apart positions along the length L of the mold 12. The bottom end margin of each leg portion 24A, 24B is attached to a respective foot plate 28A, 28B, which lies flat on an underlying support surface. The foot plates 28A, 28B can be attached to the support surface (e.g., bolted to the support surface) or can rest freely on the support surface under the weight of the mold 12. In the illustrated embodiment, the arm portions 25A, 25B and the upper end margin of the waist portion 23 of each bracket defines a U-shaped cradle for supporting a bottom portion of the mold 12. The base 20 supports the mold 12 so that its longitudinal axis LA extends parallel to the underlying support surface. Thus, in one or more embodiments, the base 20 is configured to mount the mold 12 so that the longitudinal axis LA extends generally horizontally and is not tilted toward either end of the mold. It will be understood that molding systems can be mounted on other kinds of bases without departing from the scope of the invention.

As shown in FIGS. 3 and 4, the illustrated mold 12 is a three-part mold that is shaped and arranged so that the mold cavity 14 has a generally constant, circular cross-sectional shape along the length L of the mold. The mold 12 includes first and second elongate top mold members 12A, 12B and an elongate bottom mold member 12C. Each of the mold members 12A, 12B, 12C extends the length L of the mold. The base 20 receives the bottom mold member 12C. Each of the mold members 12A, 12B, 12C can comprise a single, unitary piece of material or a plurality of pieces of material that are separately joined together or are otherwise operatively connected to from the elongate sections of the mold. Although the illustrated embodiment is a three-part mold, molds may have other numbers and arrangements of mold members (e.g., a two-part mold with mold members of semicircular cross-sectional shape) without departing from the scope of the invention.

The bottom mold member 12C is received between the arm portions 25A, 25B of the base brackets 22 and rests on the upper end margins of the waist portions 23 of the base brackets. The brackets 22 are shaped and arranged to generally conform to the outer surface of the bottom mold member 12C. The bottom mold member 12C has a generally arcuate cross sectional shape. In the illustrated embodiment, the bottom mold member has a substantially semicircular cross-sectional shape that extends from a first longitudinal edge margin of the bottom mold member to a second longitudinal edge margin. When the mold 12 is closed, the opposite first and second longitudinal edge margins of the bottom mold member 12C engage lower longitudinal edge margins of the first and second top mold members 12A, 12B, respectively, as discussed in further detail below.

Each of the first and second top mold members 12A, 12B, has an arcuate cross-sectional shape. In the illustrated embodiment, each of the first and second top mold members 12A, 12B has a quarter-circular cross-sectional shape. Each mold member 12A, 12B has a bottom longitudinal edge margin that engages a respective longitudinal edge margin of the bottom mold member 12C when the mold 12 is closed. Each top mold member 12A, 12B also has an opposite top longitudinal edge margin. As discussed in further detail below, the top longitudinal edge margins of the first and second top mold members 12A, 12C oppose but to not engage one another when the mold is closed.

Referring to FIGS. 3, 4, and 7-9, the first and second top mold members 12A, 12B are each connected to the bottom mold member 12C for pivoting movement relative to the bottom mold member 12C about respective pivot axes PA1, PA2 that are spaced apart from one another. In the illustrated embodiment, a plurality of mold member brackets 30A and hinge pins 32A pivotably secure the first top mold member 12A to the bottom mold member 12C and a plurality of mold member brackets 30B and hinge pin 32B pivotably secure the second top mold member 12B to the bottom mold member. Each mold member bracket 30A is pivotably secured to the first arm portion 25A of a respective base bracket 22 by a respective hinge pin 32A and is fixedly attached to the first top mold member 12A. Likewise, each mold member bracket 30B is pivotably secured to the second arm portion 25B of a respective base bracket 22 by a respective hinge pin 32B and is fixedly attached to the second to mold member 12B. The illustrated mold member brackets 30A, 30B are metal plates having curved cross-sectional shapes that generally conform to the respective mold member 12A, 12B. Two beams 34A, 36A extend along the length L of the mold 12 and interconnect the mold member brackets 30A spaced apart along the longitudinal axis LA of the mold 12 to form a rigid frame for opening and closing the first and second mold members 12A, 12B. Likewise, two beams 34B, 36B extend along the length L of the mold 12 and interconnect the mold member brackets 30B spaced apart along the longitudinal axis LA of the mold 12.

The hinge pins 32A, 32B allow the mold member brackets 30A, 30B to pivot relative the base brackets 22 about the pivot axes PA1, PA2. When the mold member brackets 30A, 30B pivot relative to the base brackets 22, the first and second top mold members 12A, 12B pivot with the mold member brackets about the pivot axes PA1, PA2 with respect to the bottom mold member 12C (which is fixedly secured to the base bracket). Although the illustrated embodiment uses three mold members 12A, 12B, 12C that are pivotably connected to one another by the brackets 22, 30A, 30B and the hinges 32A, 32B, other embodiments can use other arrangements of mold members the are movably connected in other ways and/or for other types of movement.

Figure 8:
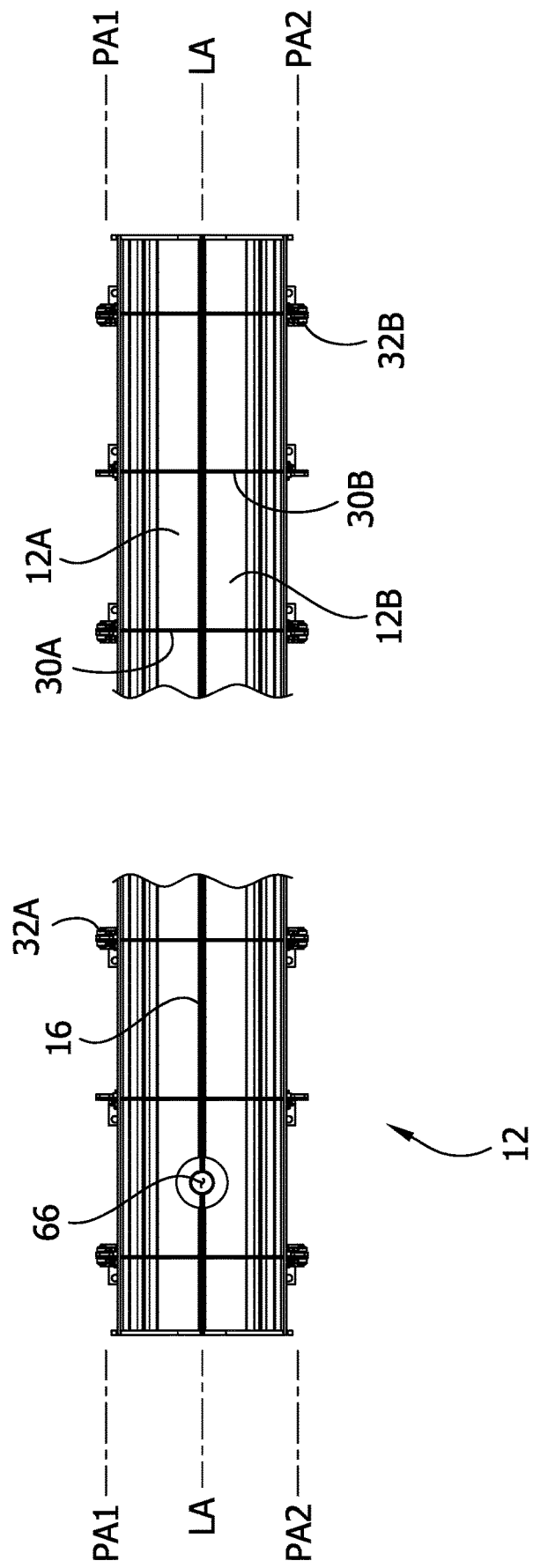
FIG. 8 is a fragmentary top plan view of the mold in the closed position.
Figure 9:
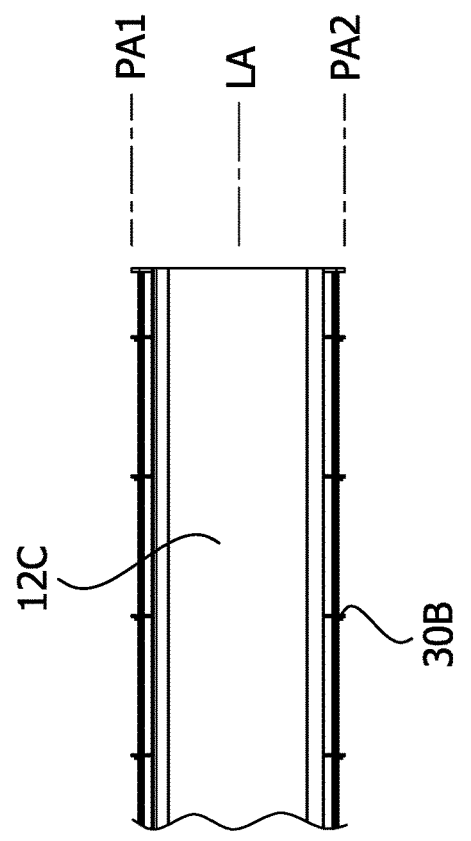
FIG. 9 is a fragmentary top plan view of the mold in the open position.

Referring to FIGS. 3, 4 and 8, the mold 12 can be selectively opened and closed by moving at least one of the mold members 12A, 12B, 12C relative to another mold member. In the illustrated embodiment the mold is opened by pivoting the first and second top mold members 12A, 12B with respect to the bottom mold member 12C about the pivot axes PA1, PA2 in respective opening directions OD1, OD2 (FIG. 3). That is, the mold member brackets 30A, 30B pivot about the hinges 32A, 32B relative to the base bracket 22 to pivot the first and second top mold members 12A, 12B in the opening directions OD1, OD2. When the mold 12 is open as shown in FIGS. 4 and 9, the top edge margins of the top mold members 12A, 12B are spaced apart from one another to define a gap 40. The pipe P can be passed into and out of the mold cavity 14 through the gap 40. To close the mold, the first and second top mold members 12A, 12B pivot with respect to the bottom mold member 12C about the pivot axes PA1, PA2 in respective closing directions CD1, CD2. That is, the mold member brackets 30A, 30B pivot about the hinges 32A, 32B relative to the base bracket 22 to pivot the first and second top mold members 12A, 12B in the closing directions CD1, CD2. When the mold is closed as shown in FIGS. 3 and 8, the top mold members 12A, 12B prevent the pipe P from passing into or out of the mold.

Figure 10:
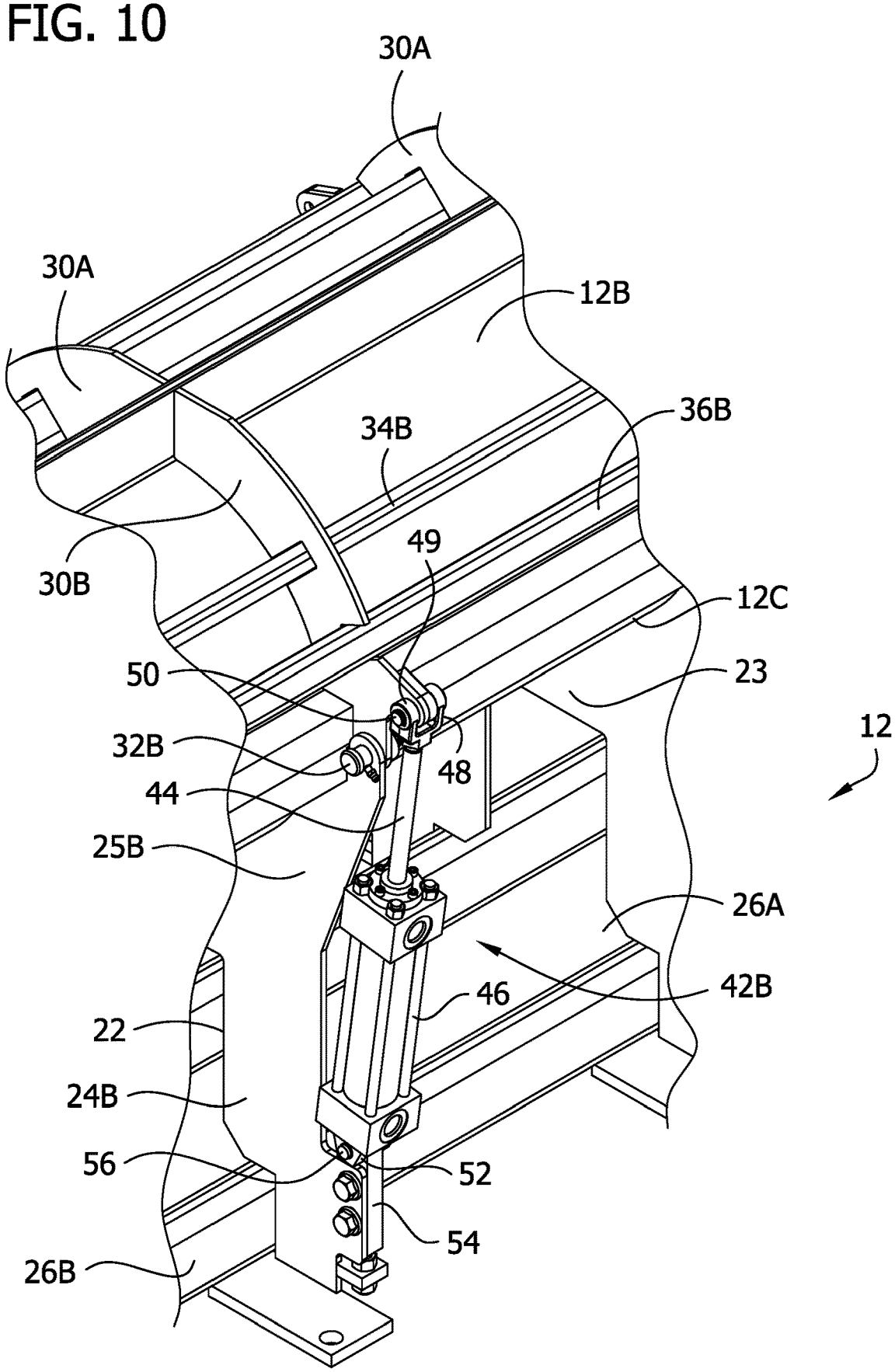
FIG. 10 is an enlarged fragmentary perspective of the mold, illustrating a mold member actuator thereof.

In the illustrated embodiment, the controller 18 is configured to selectively open and close the mold 12. Referring to FIGS. 7 and 10, the molding system 10 includes a plurality of mold member actuators 42A, 42B. The positioners 42A are configured to move the first top mold member 12A relative to the bottom mold member 12C, and the positioners 42B are configured to move the second top mold member 12B relative to the bottom mold member 12C. In the illustrated embodiment, the positioners 42A are secured to about every other first top mold member bracket 30A and base bracket 22 along the length L of the mold 112 and the positioners 42B are secured to about every other second top mold member bracket 30B and base bracket along the length of the mold (e.g., there is about one of each of the positioners 42A, 42B per every 37.5 inches along the length L of the mold 12). It will be understood that more or fewer positioners may also be used without departing from the scope of the invention. The positioners 42A are configured to drive movement of the first top mold member 12A relative to the bottom mold member 12C, and the positioners 42B are configured to drive movement of the second top mold member 12B relative to the bottom mold member.

Referring to FIG. 10, each mold member actuator 42A, 42B is a fluid-driven piston mechanism in the illustrated embodiment. Although FIG. 10 depicts only one of the positioners 42B for the first top mold member 12A, it will be understood that all of the positioners 42A for the first top mold member 12A and the positioners 42B for the second top mold member 12B are substantially the same. Each actuator 42A, 42B includes a piston 44 that is slidably received in a cylinder 46 configured to receive a driving fluid therein. In one or more embodiments, the driving fluid in each of the cylinders 46 is hydraulic fluid supplied by a hydraulic system 47 (FIG. 1). In FIG. 1, the hydraulic system 47 and the connection between the hydraulic system and one positioner of the mold 42B are illustrated schematically. It will be understood that the schematically illustrated connection represents a connection between the hydraulic system 47 and each of the positioners 42A, 42B.

As explained below, the hydraulic system 47 includes a nitrogen accumulator 47A (broadly, a pressure accumulator) for relieving overpressures in the hydraulic system. The nitrogen accumulator 47A comprises a canister or reservoir of compressible nitrogen that is operably coupled to the hydraulic fluid at a diaphragm. The diaphragm maintains fluid separation between the nitrogen and hydraulic fluid while transmitting pressure from the hydraulic fluid to the nitrogen reservoir. The nitrogen in the accumulator 47A compresses under positive pressures and thereby relieves overpressures on the hydraulic fluid during the molding process. Although a nitrogen accumulator is used in the illustrated embodiment, it will be understood that other kinds of pressure relieving accumulators, such as spring loaded canisters, may also be used in other embodiments. Also in other embodiments, driving fluids other than hydraulic fluid (e.g., compressed air, etc.) may be used without departing from the scope of the invention. Furthermore, other types of positioners besides fluid driven pistons may also be used to drive movement of one elongate mold member relative to another elongate mold member in other embodiments.

The positioners 42A, 42B are operatively connected between the base brackets 22 and the mold member brackets 30A, 30B, respectively, to drive movement of the mold member brackets relative to the base brackets and thereby move the first and second top mold members 12A, 12B relative to the bottom mold member 12C. The pistons 44 of the positioners 42A, 42B are operatively connected, at their free ends, to respective mold member brackets 30A, 30B. More specifically, clevises 48 are secured to the free end of each piston 44. The clevises receive a tang 49 of the respective mold member bracket 30A, 30B therein. A pin 50 pivotably connects the tang 49 of the respective mold member bracket 30A, 30B to the respective piston 44. A clevis 52 is likewise mounted on the bottom end of each cylinder 46. Each clevis 52 receives a tang 54 therein that is attached to (e.g., bolted to) the respective leg portion 24A, 24B of the base bracket 22. A pin 56 pivotably attaches the tang 54 to each clevis 52 to pivotably connect the respective cylinder 46 to the respective base bracket 22.

In use, the controller 18 selectively controls the delivery of the driving fluid to the cylinders 46 to actuate the piston mechanisms 42A, 42B. To open the mold 12 from the closed position, each piston 44 is retracted downward into the respective cylinder 46 (FIG. 4). The clevises 48 impart a generally downward oriented force upon the tangs 49 of the mold member brackets 30A, 30B that causes the mold member brackets 30A, 30B to pivot about the hinges 32A, 32B in the opening directions OD1, OD2. The tangs 49 and clevises 48 pivot in opposite directions about the pins 50 and the clevises 52 pivot about the pins 56 as the mold member brackets 30A, 30B pivot in the opening directions OD1, OD2. The movement of the mold member brackets 30A, 30B causes the elongate top mold members 12A, 12B to pivot about the pivot axes PA1, PA2 in the opening directions OD1, OD2 and thereby opens the mold 12. To close the mold 12 from the open position, each piston 44 is extended upward out of the respective cylinder 46 (FIGS. 3 and 10). The clevises 48 impart a generally upward oriented force upon the tangs 49 of the mold member brackets 20A, 30B that causes the mold member brackets to pivot about the hinges 32A, 32B in the closing directions CD1, CD2. The tangs 49 and clevises 48 pivot in opposite directions about the pins 50 and the clevises 52 pivot relative to the tangs 54 about the pins 56 as the mold member brackets 30A, 30B pivot in the closing directions CD1, CD2. The movement of the mold member brackets 30A, 30B causes the elongate top mold members 12A, 12B to pivot about the pivot axes PA1, PA2 in the closing directions CD1, CD2 and thereby closes the mold 12.

The illustrated mold 12 is thus configured so that the two top elongate mold members pivot upward and outward in the opening directions OD1, OD2 after moldable material is molded onto the pipe P in the mold cavity 14. As compared with a two part mold configured for relative movement of elongate mold members about a single pivot axis, the illustrated three-part mold 12 is thought to impart less stress on the molded pipe P during demolding. Each of the top mold members 12A, 12B only contacts about 90° or one-quarter of the perimeter surface area of the molded part. Each mold member in a two-part mold, by comparison, contacts about 180° or about one-half of the perimeter surface area of the molded part. The strength of engagement between a mold member and a molded part is thought to increase substantially with contact surface area and is, moreover, directly related to the amount of stress imparted on the molded part when the mold is opened. Thus, the sum of the stresses the top mold members 12A, 12B impart on the molded part during demolding (which each contact only one-quarter of the perimeter of the molded part) is thought to be less than the stress that a top mold member of a two-part mold (which contacts one-half of the perimeter of the molded part) imparts on the molded part during demolding. Moreover, using numerous fluid-driven piston mechanisms 42 that are closely spaced along the length L of each of the top mold members 12A, 12B ensures that the elongate mold members are pivoted uniformly along the length L of the mold 12, further minimizing undue stresses on the molded part that may arise due to non-uniform movement of the mold members along the length of the mold. The rigid frame created by the spaced beams 34A, 34B, 36A, 36B and interconnected brackets 30A, 30B likewise attribute to the uniform movement of the elongate mold members 12A, 12B along the length L of the mold 12.

As shown in FIGS. 3 and 7, when the mold 12 is closed, the top edge margins of the top mold members 12A, 12B define a parting line, generally at the top of the mold 12, which facilitates both filling the cavity 14 with moldable material and venting gas in the cavity to atmosphere. Each of the first and second top mold members 12A, 12B includes a lip 60A, 60B that extends upward from the top margin of the arcuate portions of the mold members. The lips 60A, 60B are generally planar and extend generally along the entire length L of the mold 12. The lips 60A, 60B define opposed parting faces of the respective mold members 12A, 12B that are oriented generally parallel to one another when the mold 12 is closed. In the closed position, the lips 60A, 60B are spaced apart from one another such that the parting faces define the elongate vent 16, which extends along the length L of the mold. In one or more embodiments, the elongate vent 16 is at least about 45 feet in length, such as greater than about 75 feet (e.g., greater than about 80 feet, about 84 feet, etc.)

As shown in FIG. 7, adjacent one end portion of the mold 12, each lip 60A, 60B includes a respective fill port segment 64A, 64B. Each fill port segment 64A, 64B flares laterally outward from the respective lip 60A, 60B to define a laterally depression, which is generally semicircular in horizontal cross-section, in the top edge portion of the respective mold member 12A, 12B. When the mold 12 is closed, the fill port segments 64A, 64B define a circular fill port 66 that is fluidly coupled with the mold cavity 14. The fill port 66 is wider than the vent 16 to receive a nozzle of an injector (not shown) for injecting moldable material into the mold cavity 14. A flange 68A, 68B extends radially outward form the top end margin of the respective fill port segment 64A, 64B to provide an engagement surface for the nozzle during filling. In use, the fill nozzle is inserted into the fill port 66 between the fill port segments 64A, 64B and delivers moldable material through the fill port and into the mold cavity 14. As discussed below, during filling, the moldable material injected through the fill port 66 displaces air in the mold cavity, and the displaced air vents through the elongate vent 16 to the atmosphere outside of the mold 12.

As discussed above, in the illustrated embodiment, the lips 60A, 60B of the mold members 12A, 12B define the elongate vent 16, which provides fluid communication between the mold cavity 14 and the atmosphere outside of the mold to vent displaced air from the mold 12. In other embodiments of the mold, the elongate vent can be formed other ways (e.g., by an elongate aperture extending radially through a single mold member, etc.). The elongate vent 16 extends generally along the longitudinal axis LA of the mold 12 (e.g., along substantially all of the length L of the mold). In the illustrated embodiment, the elongate vent 16 is positioned generally at the top of the mold 12. Although the illustrated elongate vent 16 forms a substantially continuous fluid passage between the cavity 14 and the atmosphere along its length, it will be understood that in other embodiments, the elongate mold can be discontinuous without departing from the scope of the invention. For example, the mold members can be constructed to have one or more spacers positioned along the length of the mold that extend between the parting face to support the parting faces in spaced apart relationship to define the vent.

The general size, shape, and position of the elongate vent 16 are thought to enhance filling of the mold 12. For example, the use of an elongate vent 16 that extends along the length of the top of the mold 12 allows the mold to be filled in a horizontal orientation as shown in the drawings. The mold 12 is not tilted toward either end. In the horizontal orientation, the depth of the mold cavity 14 (which is the diameter of the circular mold cavity in the illustrated embodiment) is relatively shallow (e.g., on the order of no greater than three-times the diameter of the pipe P). As the level of the moldable material along the depth of the cavity 14 increases, the air from the cavity is displaced through the vent 16 across substantially the entire length of the mold. As discussed below, after the mold cavity 14 is filled, the elongate vent 16 also allows the liquid moldable material to exit the mold cavity along substantially the entire length L of the mold as it expands during solidification. This allows the flashing the forms during molding to be substantially uniform along the length of the mold 12 to minimize concentrated stresses on the moldable material due to localized concentrations of flashing.

The molding system 10 may include one or more vacuum lines (e.g., hoses, not shown) that have one end operatively connected to the mold interior 14 and another end operatively connected to a vacuum source to extract fumes associated with the moldable material without releasing the fumes to atmosphere. In one or more embodiments, a restriction member (not shown) may be placed in the elongate vent 16 to partially restrict the flow of fluids through the vent and thereby ensure a substantial portion of the fumes are directed through the vacuum lines instead of the vent. The restriction member can comprise an elongate strip of metal (e.g., steel) extending along the length L of the mold 12 between the lip flanges 60A, 60B. Preferably the restriction member does not seal the elongate vent 16 between the two lip flanges 60A, 60B. Instead, the restriction member provides a non-sealing barrier that partially obstructs the flow of fluids through the vent 16 while still permitting displacement of gas from the mold along substantially its entire length. The restriction member is suitably positioned at the top edge margins of the lip flanges 60A, 60B so that the liquid moldable material is still able to expand into the lower portion of the elongate vent 16 during curing. The molding system 10 can include separate gas and liquid vacuum lines (not shown) that separately remove gas and liquid materials from the mold interior 14. The gas and liquid vacuum lines may be operatively connected to the mold interior at about the same location, such as adjacent the fill port 66 at a top end portion of the mold 12.

In addition to the parting line between the first and second top mold members 12A, 12B, the illustrated mold 12 includes parting lines between the bottom longitudinal edge margin of the first top mold member and the first longitudinal edge margin of the bottom mold member 12C and the bottom longitudinal edge margin of the second top mold member and the second longitudinal edge margin of the bottom mold member. To minimize the amount of flashing the forms at these side parting lines during molding, the mold 12 is configured to form seals between the bottom longitudinal edge margins of the first and second top mold members 12A, 12B and the first and second longitudinal edge margins of the bottom mold member 12C, respectively.

Figure 11:
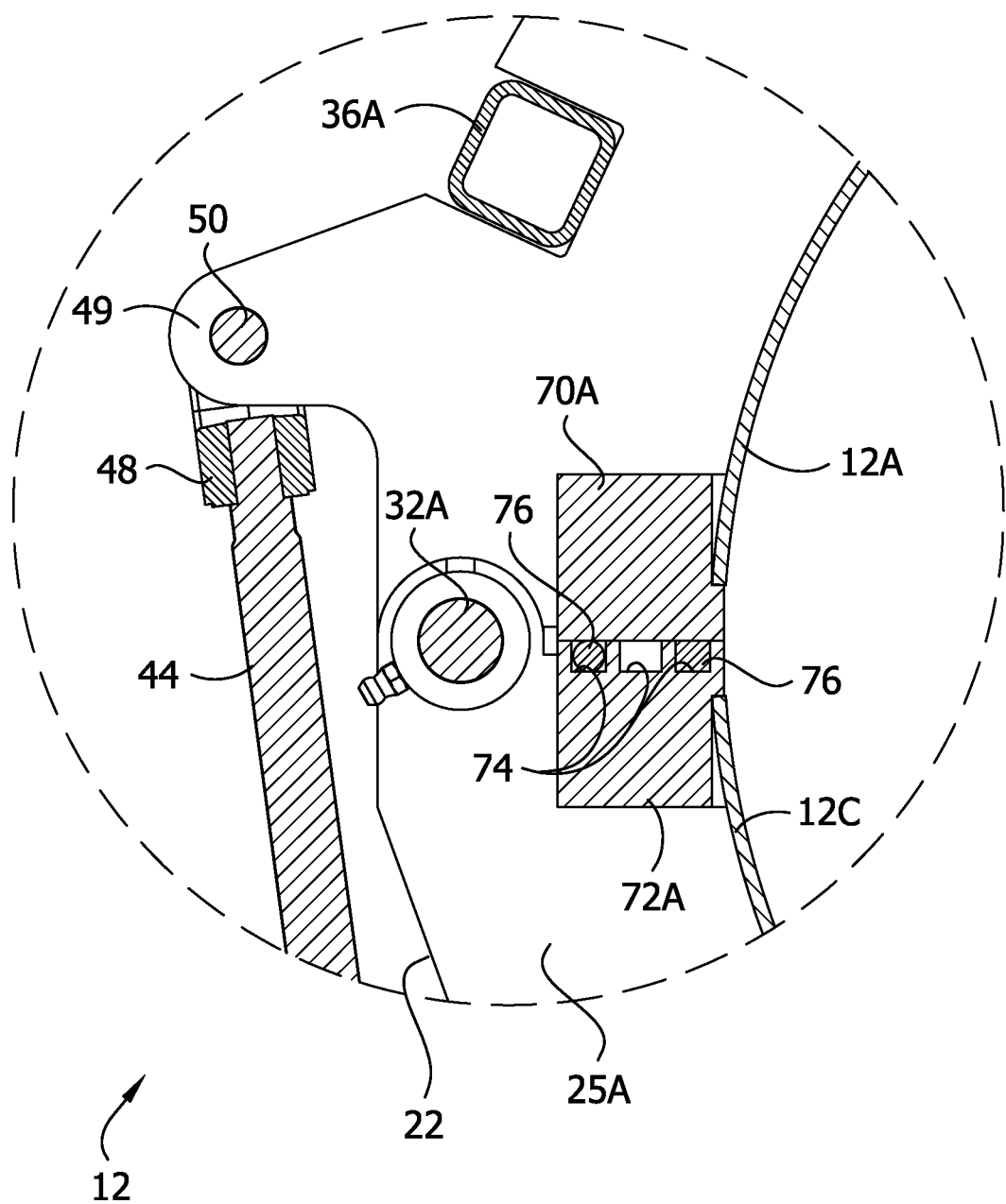
FIG. 11 is an enlarged view of a portion of FIG. 3, illustrating a seal at a side parting line of the mold.
Figure 13:
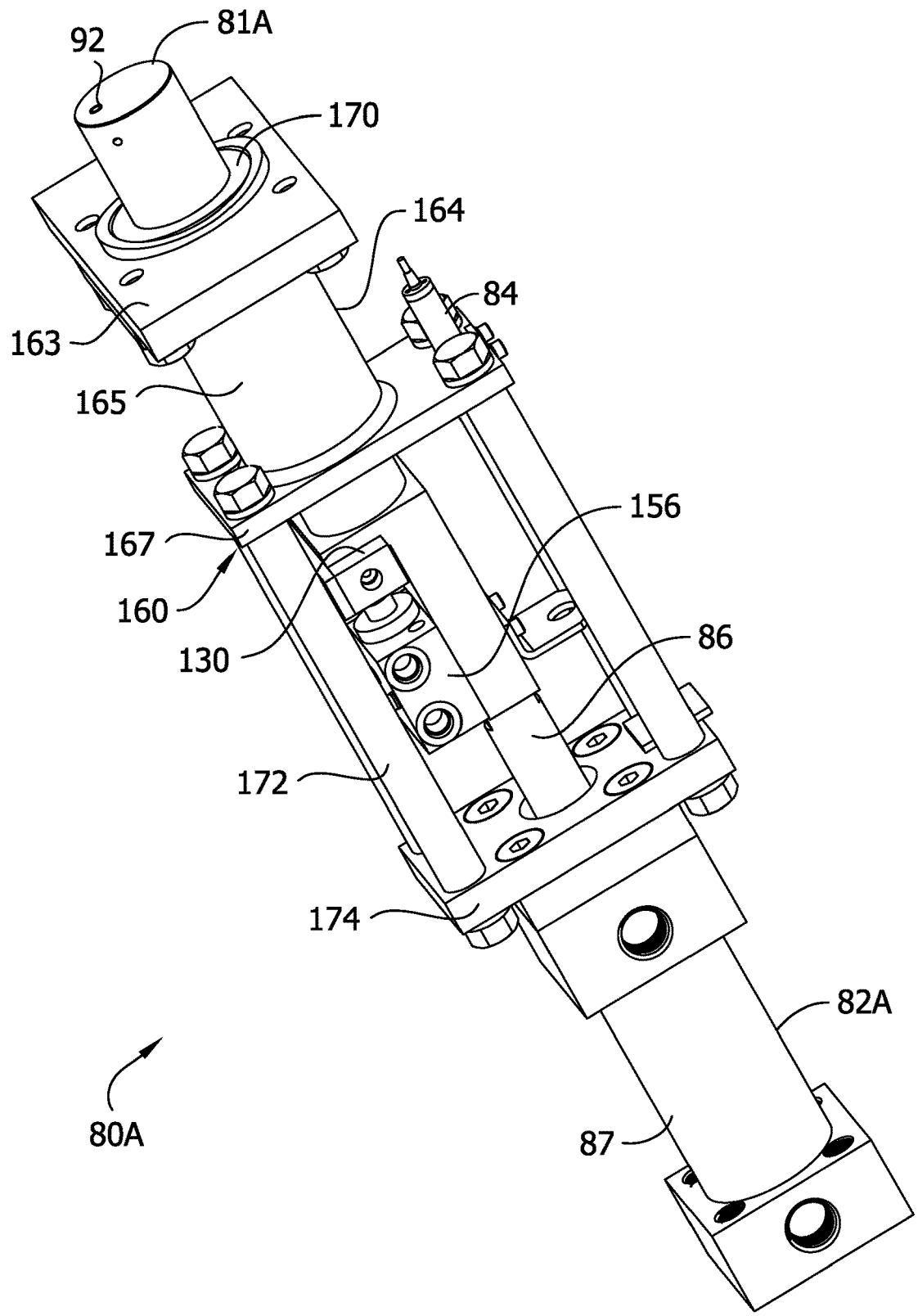
FIG. 13 is a perspective of a support mechanism of the mold.
Figure 14:
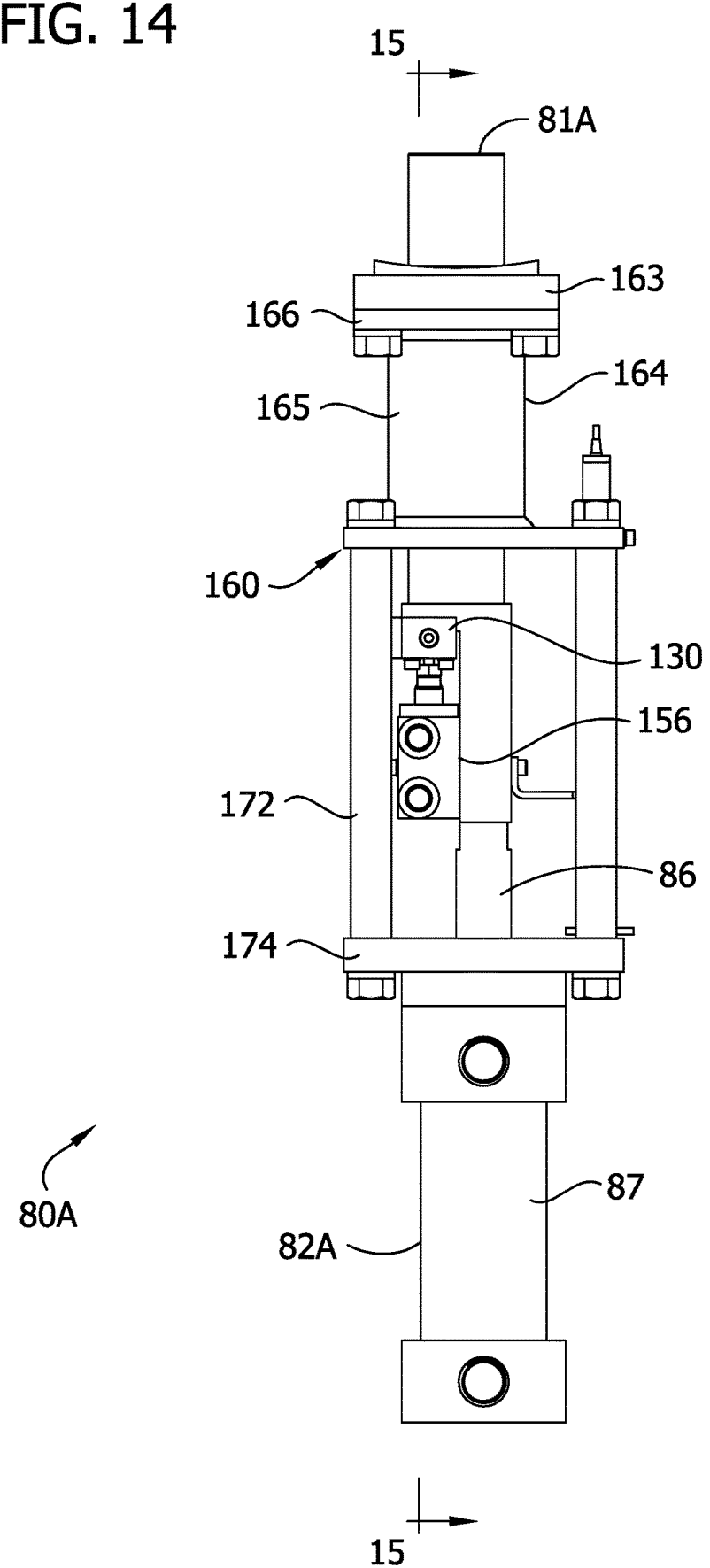
FIG. 14 is a front elevation of the support mechanism of FIG. 13.

Referring to FIGS. 3, 4 and 11, a top flange member 70A is secured to the bottom longitudinal edge margin of the first top mold member 12A and another top flange member 70B is secured to the bottom longitudinal edge margin of the second top mold member 12B. Similarly, first and second bottom flange members 72A, 72B are secured to the first and second longitudinal edge margins of the bottom mold member 12C. FIG. 11 shows only the first top flange member 70A and first bottom flange member 72A in detail, but it is understood that the second top flange member 70B and second bottom flange member 72B have a substantially the same construction. Each of the flange members 70A, 70B, 72A, 72B extends radially outward from the respective mold member 12A, 12B, 12C along the length L of the mold 12. Suitably, the radial sides of the flange members 70A, 70B, 72A, 72B are spaced radially inward of the pivot axes PA1, PA2 and hinges 32A, 32B so that the flange members on the same side of the mold 12 do not interfere with one another during opening and closing of the mold. The flange members 70A, 70B, 72A, 72B on each side of the mold 12 have opposing surfaces that engage one another when the mold 12 is closed.

Three elongate grooves 74 are formed in the upwardly facing surfaces of the bottom flange members 72A, 72B. The grooves 72 extend along the length L of the mold 12. Resiliently deformable elongate gaskets 76 are received in each of the grooves 74. The gaskets 76 substantially fill the grooves 74 and extend the length L of the mold 12. The gaskets 76 are sized and arranged so that the upwardly facing surfaces of the gaskets sealingly engage the downwardly facing surface of the respective upper flange members 70A, 70B when the mold is closed. For example, in one or more embodiments, the gaskets 74 are sized to protrude upward from the upwardly facing surfaces of the bottom flange members 72A, 72B so that the upper flange members 70A, 70B engage and resiliently compress the gaskets when the mold 12 is closed. Other configurations for sealing the parting line between adjacent elongate mold members are also possible without departing from the scope of the invention.

Referring to FIGS. 12-16, the molding system 10 includes a plurality of pipe support mechanisms 80A, 80B that are spaced apart along the length L of the mold 12 and extend radially into the mold cavity 14 to support the pipe P in a molding position within the mold cavity. FIGS. 13-16 illustrate one of the support mechanisms 80A, but it will be understood that the other support mechanisms 80A, 80B may be substantially identical to the illustrated support mechanism. In the illustrated embodiment, the molding position is a radially centralized position within the cavity 14, as shown in broken line in FIG. 12, but the pipe may be supported in other molding positions in other embodiments. As shown in FIG. 2, the illustrated molding system 10 includes two pairs of retractable support mechanisms 80A, 80B that are spaced apart from respective ends of the mold 12 by about one third of the length L of the mold. In the illustrated embodiment, the first support mechanism 80A in each pair is slightly offset from the second support mechanism 80B in the pair along the length L of the mold 12.

Each pipe support mechanism 80A, 80B includes a support 81A, 81B. The illustrated supports 81A, 81B are generally cylindrical rods, but supports having other shapes and configurations may also be used. As shown in FIG. 12, a first support 81A of a first one of the pair of support mechanism 80A extends radially inward from the bottom mold member 12C along a first support axis SA1 and a second support 81B of the second support mechanism 80B extends radially inward from the bottom of the mold member along a second support axis SA2 oriented transverse to the first support axis. When the pipe P is initially placed into the mold cavity 14, the free ends of the supports 81A, 81B engage the bottom portion of the pipe on opposite sides of a center axis thereof to support the pipe in the molding position. Other molds may have other numbers and arrangements of supports for supporting the pipe in the molding position without departing from the scope of the invention.

Referring to FIGS. 12-16, each of the support mechanisms 80A, 80B is operatively connected to a respective support driver 82A, 82B. The support drivers 82A, 82B are configured to control movement of the respective support 81A, 81B along the respective support axis SA1, SA2 (e.g., radially of the mold 12). In the illustrated embodiment, each of the support drivers 82A, 82B includes a piston 86 that is driven by a hydraulic drive cylinder 87. One end portion of the piston 86 is slidably received in the cylinder 87 and an opposite free end portion of the piston is operatively connected to the respective support 81A, 81B. Suitably, the drivers 82A, 82B are configured to drive the pistons 86 using hydraulic fluid supplied to the cylinders 87. In the illustrated embodiment, the cylinders 87 are all connected to a common source of hydraulic drive fluid 88, which is schematically illustrated in FIG. 12. In FIG. 12, the hydraulic fluid source 88 is illustrated schematically, and a connection between the hydraulic fluid source 88 and the support mechanism 80B is also illustrated schematically. It will be understood that the schematically illustrated connection represents the connection between the fluid source 88 and the positioners 82A, 82B of each of the support mechanisms 80A, 80B. It will be understood, however, that the other kinds of drivers, including fluid driven drivers that use driving fluids other than hydraulic fluid, may be used to drive movement of the supports in other embodiments.

Referring to FIGS. 12 and 12A, each of the support mechanisms 80A, 80B includes a mounting assembly 160 that operatively mounts the support mechanism on the mold 12. The mounting assembly 160 mounts each support mechanism 80A, 80B so that the respective support 81A, 81B can move along the support axis SA1, SA2 through an opening 162 in the bottom mold member 12C. In the illustrated embodiment each mounting assembly includes a mounting plate 163 that is joined (e.g., welded) to the outer surface of the bottom mold member 12C and a sleeve member 164 that is mounted on the mounting plate. The mounting plate 163 defines a hole that is positioned in register with the respective opening 162 in the mold member 12C to allow passage of the respective support 81A, 81B through the opening and into the mold cavity 14. Suitably, each mounting plate 163 is mounted on the bottom mold member 12C so that there is a fluid tight joint between the mounting plate and mold member that extends circumferentially around the respective opening. As explained below, the sleeve member 164 connects the respective support mechanism 80A, 80B to the mounting plate 160.

The sleeve member 164 includes a hollow tube portion 165 that defines a passage that extends along the respective support axis SA1, SA2 between inner and outer flange portions 166, 167. Each of the flange portions 166, 167 defines an opening in register with the passage of the tube portion 165 such that the respective support 81A, 81B is slidably received in the sleeve member 164 for movement along the respective support axis SA1, SA2 through the sleeve member. A low friction tube bearing 168 is received in the tube portion 165 of the sleeve member to bear against the outer surface of the respective support 81A, 81B as it moves along the support axis SA1, SA2. The inner flange portion 166 of the sleeve member 164 is bolted to (broadly, mounted on) the mounting plate 163, and a resiliently deformable annular seal 170 (FIG. 12A) is positioned between the mounting plate and sleeve member. Each annular seal 170 forms fluid seal that inhibits moldable material from escaping the mold cavity 14 through the interface between the respective mounting plate 163 and sleeve member 164. The inner flange portion 166 is also shaped and arranged to define a seat for receiving an annular seal 171 that extends circumferentially around and sealingly engages the perimeter of the respective support 81A, 81B. Thus, the annular seal 171 inhibits moldable material from escaping the mold cavity 14 through the interface between the sleeve member 164 and the respective support 81A, 81B.

Connecting rods 172 (FIG. 12) extend between the outer flange portion 167 of each sleeve member 164 and a flange portion 174 of the respective drive cylinder 87. The outer flange portions 167 are bolted to (broadly, attached to) one end of each connecting rod 172 and the cylinder flange portion 174 is bolted to (broadly, attached to) the other end. Thus, the mounting plate 163, the sleeve member 164, and the connecting rods 172 are connected together to operatively mount the support mechanism 80A, 80B on the mold 12. It will be understood that other mounting assemblies can be used to operatively mount a support mechanism on a mold in other embodiments.

The drivers 82A, 82B are operatively connected to the controller 18 (FIG. 1) in one or more embodiments. Suitably, the controller 18 is configured to operate the drivers 82A, 82B to move the supports 81A, 81B to an operative position for supporting the pipe P in the molding position before the pipe is placed into the mold 12. In certain embodiments, the controller 18 may also be configured to operate the drivers 82A, 82B to retract the supports 81A, 81B from the mold cavity (e.g., by driving movement of the supports radially outward along the support axes SA1, SA2) when the annular portion of the mold cavity 14 that extends circumferentially around the pipe P is at least partially filled with the moldable material such that the moldable material in the annular portion of the mold cavity supports the pipe in the molding position (e.g., a centralized position). As explained below, however, in the illustrated embodiment, hydraulic movement of the drivers 82A, 82B does not drive retraction of the supports 81A, 81B. Instead, after the moldable material in the mold cavity 14 is sufficient cured to support the pipe P in the molding position, the controller 18 is configured to switch the hydraulic drivers 82A, 82B to a neutral configuration in which external forces acting on the supports 81A, 81B are capable of driving movement of the supports. As explained below, the support mechanisms 80A, 80B are configured to inject moldable material at the distal ends of the supports 81A, 81B, which causes the supports to act as pistons that are driven radially outward along the support axes SA1, SA2 by the injection of moldable material. Thus, the support mechanisms 80A. 80B are configured to retract the supports 81A, 81B from the mold cavity when they are no longer needed to support the pipe in the molding position so that the molding material as applied to the pipe has an unbroken outer surface to completely encapsulate the outer surface of the pipe P. In the illustrated embodiment, a displacement potentiometer 89 (broadly, position sensor) is operatively connected between each support 81A, 81B and the respective mounting assembly 160 to monitor the position of the support along the respective support axis SA1, SA2. Suitably, the potentiometer 89 is configured to provide a feedback signal to the controller 18 representative of the position of the support.

Figure 15:
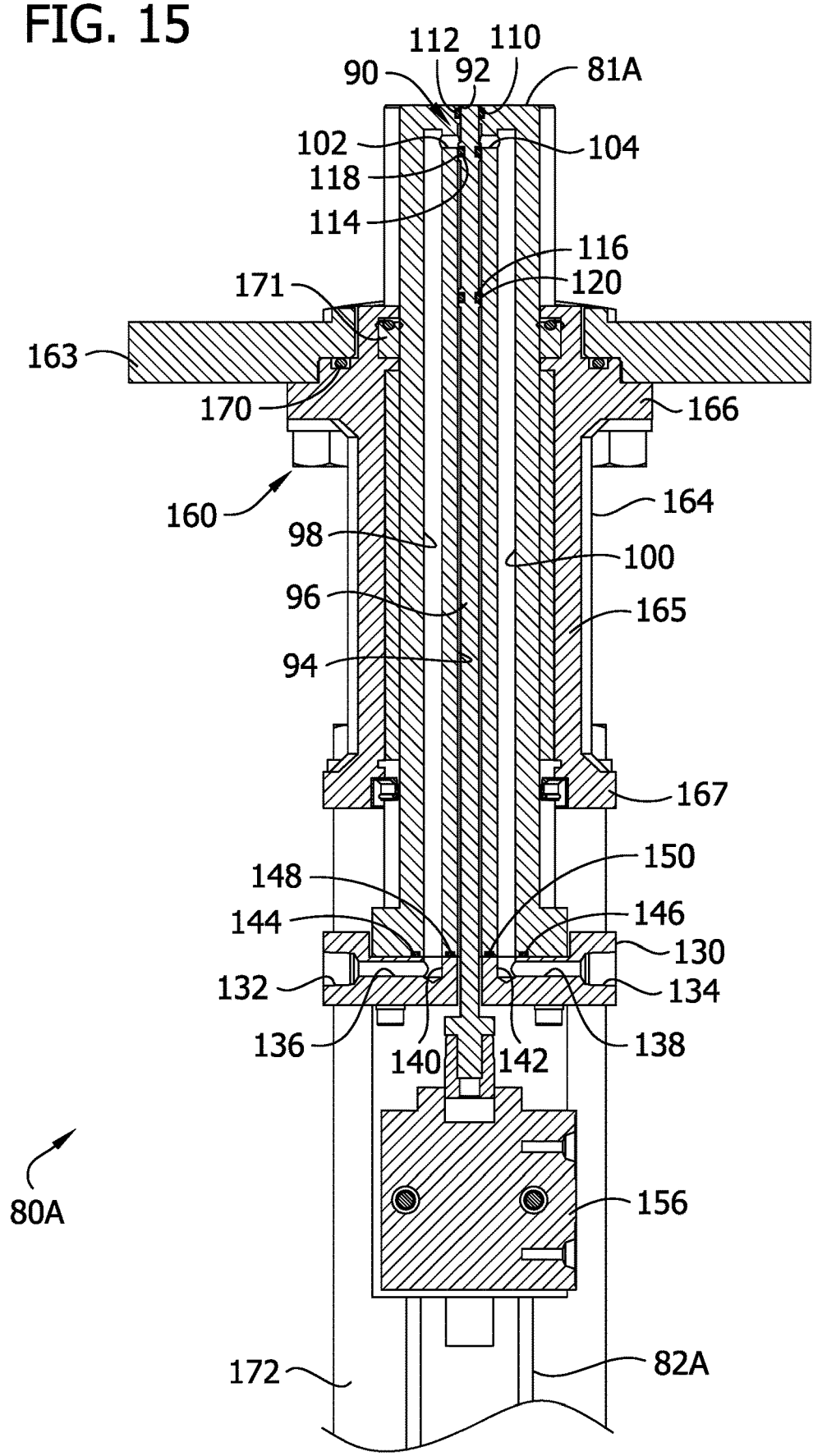
FIG. 15 is an enlarged fragmentary section taken in the plane of line 15-15 of FIG. 14, illustrating an injector of the support mechanism in a closed position.
Figure 16:
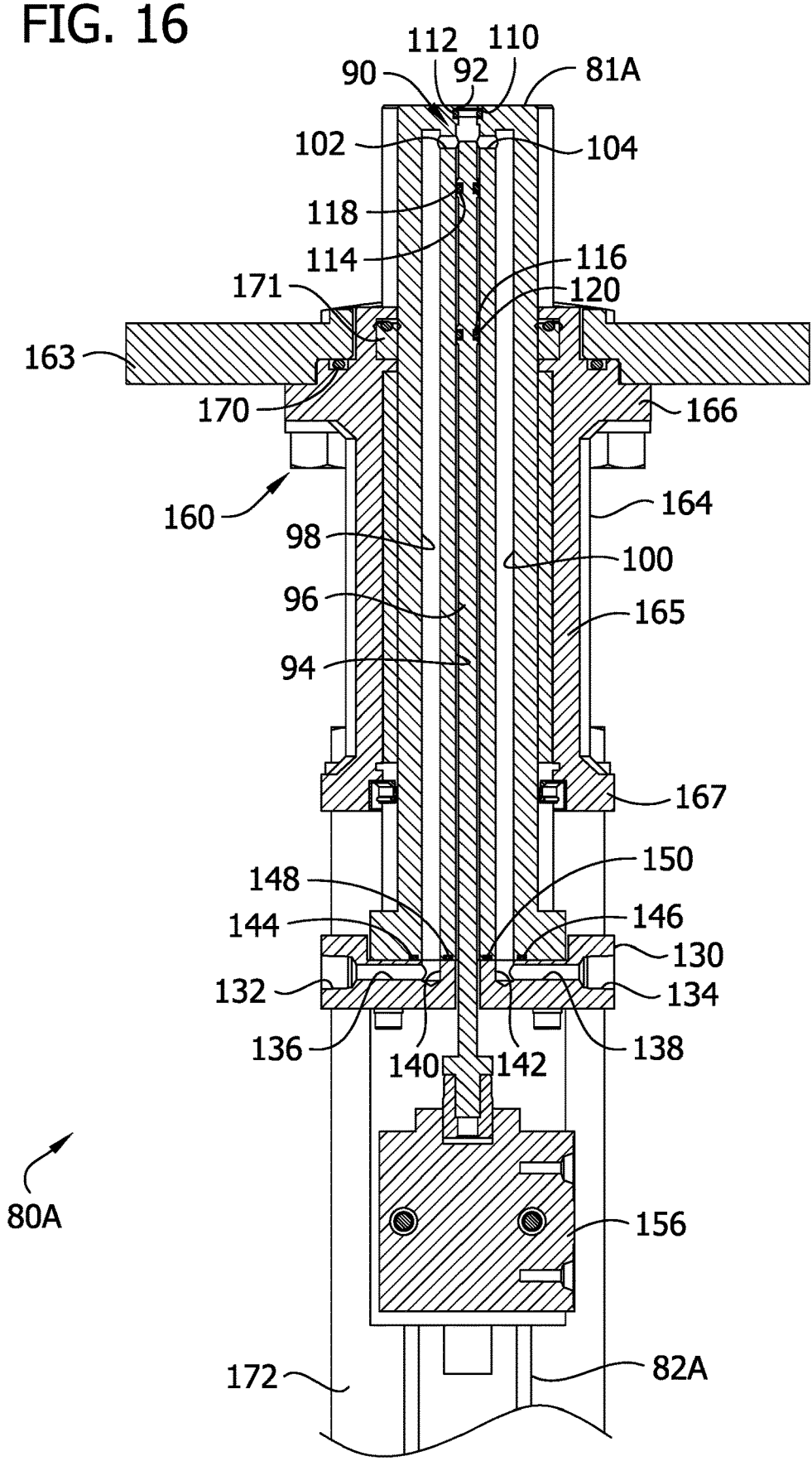
FIG. 16 is an enlarged fragmentary section similar to FIG. 15, illustrating the injector in an open position.

Referring to FIGS. 15 and 16, each of the support mechanisms 80A, 80B comprises an injector 90 for injecting moldable material into the mold cavity 14. After the moldable material cures sufficiently to support the pipe P in the molding position without the supports 81A, 81B, the supports can be retracted from the cavity 14. But when the supports 81A, 81B are withdrawn, they leave behind spaces in the partially cured moldable material where they once were positioned. The injectors 90 are configured to backfill the spaces with moldable material as the supports 81A, 81B are withdrawn radially from the cavity so that the resulting molded pipe coating is substantially free of spaces formed by the supports. In addition, the injectors 90 are configured to create a back pressure at the inner ends of the supports 81A, 81B that drives the retraction of the supports from the mold cavity 14 after the controller 18 switches the hydraulic drivers 82A, 82B to the neutral configuration.

In the illustrated embodiment, each injector 90 includes an injection nozzle 92 comprising an opening at the free end of the respective support 81A, 81B arranged to inject moldable material radially inward into the cavity 14. The opening defining the nozzle 92 is fluidly connected to an injector valve passage 94 that extends through the respective support 81A, 81B generally along the support axis SA1, SA2. A valve body 96 extends through the valve passage 94 and is movable (e.g., retractable) generally along the axis of the valve passage between an open position (FIG. 16) and a closed position (FIG. 15). The valve passage 94 is fluidly coupled to first and second moldable material flow passages 98, 100 by respective connecting passages 102, 104. In the closed position, the valve body 96 prevents passage of moldable material from the connecting passages 102, 104 into the nozzle 92 of the injector 90, and in the open position, the valve body 96 permits the moldable material to be dispensed through the nozzle.

In the illustrated embodiment, the supports 81A, 81B each define an upper seal seat 110 spaced apart from the connecting passages 102, 104 toward the free end of the respective support. The seal seat 110 is shaped and arranged to support an upper annular seal 112 (e.g., an O-ring) that sealingly engages the perimeter of an end portion of the valve body 96 in the closed position. The seal between the annular seal 112 and the perimeter of the valve body 96 prevents moldable material from passing through the nozzle 92 when the injector 90 is in the closed position. The valve body 96 includes first and second lower seal seats 114, 116 that support first and second lower annular seals 118, 120. The lower annular seals 118, 120 sealingly engage portions of the respective support 81A, 81B that define the valve passage 94 at locations that are spaced apart from the connecting passages 102, 104 toward the respective driver 82A, 82B. The annular seals 118, 120 prevent moldable material in the connecting passages 102, 104 from passing downward through the valve passage 94.

In the illustrated embodiment, a moldable material manifold block 130 is operatively mounted on the lower end portion of each support 81A, 81B to connect the supply passages 98, 100 to a reservoir of moldable material 131, shown schematically in FIG. 12. In FIG. 12, the reservoir of moldable material is illustrated schematically, and a connection between the reservoir and the support mechanism 80A is also illustrated schematically. It will be understood that the schematically illustrated connection represents the connection between the reservoir 131 and the injectors 90 of each of the support mechanisms 80A, 80B. The manifold block 130 is mounted on the respective support 81A, 81B for movement with the support along the respective support axis SA1, SA2. First and second inlet ports 132, 134 are formed in opposite side portions of the manifold block 130 for connection to a conduit (not shown) for receiving moldable material. Connecting passages 136, 138 fluidly connect the inlet ports 132, 134 to outlet ports 140, 142 of the manifold block 130. The outlet ports 140, 142 are configured for fluid connection to the supply passages 98, 100 (e.g., the manifold block is shaped and arranged so that the outlet portions are positioned in register with the supply passages), when the manifold block is mounted on the lower end of the respective support 81A, 81B. Annular seals 144, 146 are received in recessed seal seats 149, 150 at the lower end of each support 81A, 81B. The seals 144, 146 sealingly engaging the manifold block 130 about the perimeter of the outlet ports 140, 142 to fluidly seal the interface between the manifold block and the support 81A, 81B. The manifold block 130 therefore provides fluid communication between a dispenser of the moldable material and the supply passages 98, 100 of the injector 90.

The valve body 96 is operatively connected to an actuator 156 configured to drive movement of the valve body 96 along the axis of the valve passage 94 between the open and closed positions. In the illustrated embodiment, the valve actuator 156 is a hydraulic piston mechanism, but other positioner mechanisms can also be used without departing from the scope of the invention. The actuator 156 is mounted on the manifold block 130 for movement with the support 81A, 81B along the respective support axis SA1, SA2. To inject moldable material from the injector 90, the actuator 156 moves the valve body 96 downward through the valve passage 94 until the connecting passages 102, 104 are fluidly coupled to the nozzle 92. Moldable material supplied at the inlet ports 132, 134 to the manifold block 130 flows through the connecting passages 136, 138 and outlet ports 140, 142 of the manifold block, and further through the supply passages 98, 100 and connecting passages 102, 104 of the respective support 81A, 81B into the nozzle 92. The moldable material flows out of the injector nozzle 92 into a space in the partially cured moldable material in the mold cavity 14 produced by retraction of the supports 81A, 81B. It will be understood that the back filling and retraction of the supports 81A, 81B occurs at the same time so that the space left by the retracting support is filled almost simultaneously as the space is formed. When the space is completely filled, the actuator 156 moves the valve body 96 upward through the valve passage 94 to close the injector 90.

Suitably, the controller 18 is operatively connected to the valve actuator 156 and the support driver 82A, 82B to control the timing of the space backfilling process. For example, the controller 18 can automatically direct withdrawal the support 81A, 81B from the mold cavity 14 when it determines the moldable material in the cavity has cured a sufficient amount to support the pipe P. In one embodiment, the controller 18 is configured to receive one or more inputs (e.g., user inputs, sensor inputs, etc.) that indicate when the mold 12 is first filled with liquid moldable material. The controller 18 automatically directs withdrawal of the supports 80A, 80B from the cavity 14 after a predetermined time interval has passed that corresponds with sufficient curing to support the pipe P. In another embodiment, the molding system 10 includes sensors (not shown) (e.g., force sensors that detect forces imparted on one or more of the mold members 12A, 12B, 12C by exothermic expansion of the moldable material during curing, etc.) that are operatively connected to the controller 18 to provide a signal from which the controller can determine when the moldable material is sufficiently cured.

After the controller determines that the moldable material in the cavity 14 is capable of supporting the pipe P, the controller 18 switches the support drivers 82A, 82B to the neutral configuration and directs the valve positioners 156 to open the injectors 90 so that the injectors dispense moldable material. The injected moldable material fills the space created by each support 81A, 81B and creates a back pressure at the inner end of each support. Since the support drivers 82A, 82B are in the neutral position, they do not prevent retraction of the supports 81A, 81B along the support axes SA1, SA2. The back pressure created by the injected material imparts an outward force on each support 81A, 81B oriented generally along the respective support axis SA1, SA2. The force drives movement of the support 81A, 81B outward along the support axis SA1, SA1 through the space in the moldable material previously defined by the support, like a piston through a pressurized cylinder. Thus, the injectors 90 act as support drivers that drive movement of the supports 81A, 81B out of the mold cavity 14 while simultaneously back filling the spaces created by the supports with moldable material. In this way, there is essentially never a space between the end of the support 81A, 81B and the pipe P that is not filled with moldable material.

Having described various aspects of the molding system 10, an exemplary method of using the molding system to apply moldable material to a pipe P will now be described. Various aspects of the method of using the molding system 10 are described as being automatically directed or performed by the controller 18 or manually initiated or carried out by a user. It will be understood, however, that any of the aspects of the method may be performed manually or automatically at the behest of the controller 18 or another automation system without departing from the scope of the invention.

Initially, a user provides an input to the controller 18 through a user input device (e.g., an actuator, a switch, etc., not shown) to open the mold 12. The controller 18 directs the mold member actuators 42A, 42B to pivot the first and second top mold members 12A, 12B in the opening directions OD1, OD2 about the pivot axes PA1, PA2. If the supports 81A, 81B are not already positioned in the mold cavity 14 for holding the pipe P in the molding position, the controller 18 directs the support drivers 82A, 82B to move the supports along the support axes SA1, SA2 into position for supporting the pipe P in the molding position within the mold cavity 14. With the mold 12 open and the supports 81A, 81B positioned in the pipe supporting positions, the user lowers the pipe P through the gap 40 and onto the supports. The supports 81A, 81B support the pipe P in the central molding position within the mold 12. After the controller 18 receives a signal that the pipe P is positioned in the molding position (e.g., either from the user via the user input device or from a suitably configured sensor (not shown)), it directs the mold member actuators 42A, 42B to close the mold 12 by pivoting the top mold members 12A, 12B in the closing directions CD1, CD2 about the pivot axes PA1, PA2. As explained above, the step of closing the mold 12 comprises moving the first and second top elongate mold members 12A, 12B relative to the bottom elongate mold member 12C (e.g., pivoting the top mold members 12A, 12B about horizontal pivot axes PA1, PA2, respectively) to position a parting face of each of the first and second top elongate mold members in opposing spaced apart relationship with one another to define the elongate vent 16.

After the pipe P is received in the mold cavity 14 and the mold 12 is in the closed position, the user can fill the annular portion of the mold cavity that extends circumferentially around the pipe with the moldable material. The user inserts the moldable material injector (not shown) into the fill port 66 and injects moldable material into the mold cavity 14. For example, the user fills the annular portion of the mold cavity 14 with the moldable material from a location below a top of the mold cavity (e.g., at a tip of the injection nozzle located radially inward of the fill port 66) so that the mold cavity fills from a bottom toward the top of the mold cavity. In one or more embodiments, the controller 18 is operatively connected to the injector to control the amount of moldable material that is directed into the mold cavity; in another embodiment, the user manually controls injection. As discussed above, the moldable material is injected into the mold cavity 14 when the mold 12 is oriented generally horizontally. Thus, the level of the moldable material in the mold cavity 14 with respect to the depth of the mold 12 gradually increases along the entire length L of the mold at about the same rate. As moldable material fills the cavity 14, the air in the cavity is displaced upward through the elongate vent 16 along the length L of the mold 12. For example, the displaced air vents radially outwardly from the mold 12 at least plural locations along the longitudinal axis LA of the mold through the elongate vent 16.

The molding system 10 is configured to accommodate exothermic expansion of the moldable material that occurs during curing of the moldable material in the mold cavity 14. During an initial curing phase, all or most of the moldable material is in a liquid state. The liquid material expands as it begins to cure. As the volume of moldable material expands to exceed the volume of the annular portion of the mold cavity 14, the excess liquid moldable material passes into and/or through the elongate vent 16. Thus, the stresses imparted on the mold 12 by the liquid expansion of the moldable material are minimized because the liquid material is allowed to expand into the vent 16. The expansion of the liquid moldable material into the elongate vent 16 creates flashing at the elongate vent in the resulting molded part. But the stresses imparted on the molded part at the vent flashing during demolding is minimized because the mold lips 60A, 60B, which engage and define the vent flashing, move away from the mold in opposing directions as the mold members 12A, 12B pivot in the opening directions OD1, OD2, without generating substantial shear stresses or other localized stresses on the vent flashing.

The moldable material continues to expand even after most or all of the moldable material has solidified. As the solidified moldable material expands, it imparts expansion forces on the mold 12, which the top mold members 12A, 12B transmit to the hydraulic system 47, creating an overpressure in the hydraulic fluid. Initially, the nitrogen in the nitrogen accumulator 47A compresses to absorb the overpressure of the hydraulic fluid. As the nitrogen is compressed, the hydraulic system passively responds by partially opening the top mold members 12A, 12B. In certain embodiments, to further minimize stresses imparted on the mold due to expansion of the solidified moldable material, the controller 18 may be configured to direct the mold member actuators 42A, 42B to partially open the mold 12 as the solidified moldable material continues to cure. However, in the illustrated embodiment, the nitrogen accumulator 47A provides sufficient mold expansion so that active opening of the mold 12 during curing is not required. When the controller 18 is used to actively open the mold 12, the controller is configured to prevent the positioners 42A, 42B from opening the mold prior to solidification of at least some of the moldable material. After some or all solidification has occurred, the controller 18 can direct the mold member actuators 42A, 42B to move each of the first and second top mold members 12A, 12B in the respective opening directions OD1, OD2 to partially open the mold 12. This reduces forces imparted upon the mold due to the expansion of the moldable material. That is, the positioners 42A, 42B pivot each of the first and second top elongate mold members 12A, 12B about the respective pivot axis PA1, PA2 toward the open position, but not fully to the open position, to relieve stresses on the mold 12. Thus, before the moldable material has fully expanded during curing, the controller 18 is configured to partially open the mold 12 to accommodate expansion.

After the moldable material has cured a sufficient amount to support the pipe P in the molding position without the supports 81A, 81B, the controller switches the support drivers 82A, 82B to the neutral configuration to allow withdrawal the supports from the mold cavity 14. This step can occur before, after, or concurrently with the step of partially opening the mold 12 to accommodate expansion of the partially cured moldable material, depending on the curing characteristics of the moldable material. The injectors 90 inject moldable material to drive movement of the supports 81A. 81B radially outward along the support axes SA1, SA2 to backfill the spaces formed in the moldable material by the retracting supports 81A, 81B. The moldable material in the spaces cures along with the rest of the moldable material in the cavity 14 to form a uniform coating or external layer of cured moldable material (e.g., insulation) on the pipe P.

When the moldable material has cured, the controller 18 directs the mold member actuators 42A, 42B to move the first and second mold members 12A, 12B to the open position. More specifically, the controller 18 directs the mold member actuators 42A, 42B to pivot the first and second top mold members 12A, 12B about the pivot axes PA1, PA2 relative to the bottom mold member 12C to open the mold. With the mold 12 opened, the user removes the finished pipe, which may be suitable for insulated pipe applications, such as for use as a subsea pipeline or riser segment.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A molding system for applying a moldable material to a pipe, the molding system comprising:
   a mold having first and second end portions spaced apart along a longitudinal axis of the mold, the mold having a length extending along the longitudinal axis of the mold from the first end portion to the second end portion, the mold having an interior defining a mold cavity and an exterior, the mold cavity being configured for receiving the pipe therein so that the pipe extends generally along the longitudinal axis of the mold, the mold having an open position in which the mold cavity is open for passing the pipe into and out of the mold cavity, and a closed position in which the pipe cannot pass into or out of the mold cavity;
   a support configured to hold the pipe in the mold cavity so that an annular portion of the mold cavity extends circumferentially around the pipe in the closed position of the mold; and
   an elongate vent defined by the mold in the closed position providing fluid communication between the mold cavity and the atmosphere outside of the mold so that air in the mold cavity displaced by moldable material received into the mold cavity vents through the elongate vent along the longitudinal axis of the mold;
   wherein the elongate vent comprises an elongate slot at the exterior of the mold that extends along the longitudinal axis of the mold;
   wherein the elongate slot is configured to receive a portion of the moldable material that forms flashing along the length of the mold;
   wherein the length of the mold is at least 45 feet;
   wherein the mold is supported so that the longitudinal axis of the mold extends horizontally; and
   wherein the mold comprises first and second elongate mold members, the first mold member being movable relative to the second mold member to an open member position corresponding to the open position of the mold and a closed member position corresponding to the closed position of the mold, the molding system further comprising:
   a positioner operatively connected to the first mold member to move the first mold member between the open member position and the closed member position; and
   a controller configured to control the positioner to:
   position the first mold member in the closed position while the mold is filled with the moldable material and
   move the first mold member toward the open position to partially open the mold as the moldable material cures to reduce forces imparted upon the mold due to expansion of the moldable material during curing.

2. The molding system as set forth in claim 1, wherein the elongate vent extends longitudinally of the mold.

3. The molding system as set forth in claim 1, wherein the elongate vent is located at a top portion of the mold.

4. The molding system as set forth in claim 1, wherein the first and second elongate mold members define opposing longitudinal parting faces, the longitudinal parting faces of the first and second molding members defining a parting line of the mold when the mold is closed.

5. The molding system as set forth in claim 4, wherein the parting line is located at a top portion of the mold.

6. The molding system as set forth in claim 5, wherein the parting faces of the first and second elongate mold members are spaced apart from one another when the mold is closed to define the elongate vent.

7. The molding system as set forth in claim 1, wherein the mold further includes a bottom elongate mold member, the first and second elongate mold members being pivotably secured to the bottom elongate mold member, respectively.

8. The molding system as set forth in claim 7, wherein the first and second elongate mold members define respective parting lines with the bottom elongate mold member when the mold is closed, the molding system further comprising first seals at the parting lines between the first and second elongate mold members and the bottom elongate mold member.

9. The molding system as set forth in claim 1, wherein the elongate vent extends along a length that is at least 45 feet.

10. The molding system as set forth in claim 9, wherein the length of the elongate vent is greater than 75 feet.

11. The molding system as set forth in claim 1, wherein the mold further includes a fill port extending radially through the mold at the elongate vent.

12. The molding system as set forth in claim 1, wherein the elongate vent forms a substantially continuous fluid passage between the interior of the mold atmosphere along substantially the entire length of the mold.

13. The molding system as set forth in claim 1, wherein the elongate vent forms a substantially continuous fluid passage for a distance of at least 45 feet.

14. A method of applying a moldable material to a pipe comprising:

providing a molding system, the molding system comprising:
a mold having first and second end portions spaced apart along a longitudinal axis of the mold, the mold having a length extending along the longitudinal axis of the mold from the first end portion to the second end portion, the mold having an interior defining a mold cavity and an exterior, the mold cavity being configured for receiving the pipe therein so that the pipe extends generally along the longitudinal axis of the mold, the mold having an open position in which the mold cavity is open for passing the pipe into and out of the mold cavity, and a closed position in which the pipe cannot pass into or out of the mold cavity;
a support configured to hold a pipe in the mold cavity so that an annular portion of the mold cavity extends circumferentially around the pipe in the closed position of the mold;
an elongate vent defined by the mold in the closed position providing fluid communication between the mold cavity and the atmosphere outside of the mold so that air in the mold cavity displaced by moldable material received into the mold cavity vents through the elongate vent along the longitudinal axis of the mold;
wherein the elongate vent comprises an elongate slot at the exterior of the mold that extends along the longitudinal axis of the mold;
wherein the elongate slot is configured to receive a portion of the moldable material that forms flashing along the length of the mold;
wherein the length of the mold is at least 45 feet;
wherein the mold is supported so that the longitudinal axis of the mold extends horizontally; and
wherein the mold comprises first and second elongate mold members, the first mold member being movable relative to the second mold member to an open member position corresponding to the open position of the mold and a closed member position corresponding to the closed position of the mold, the molding system further comprising:
a positioner operatively connected to the first mold member to move the first mold member between the open member position and the closed member position; and
a controller configured to control the positioner to:
position the first mold member in the closed position while the mold is filled with the moldable material and
move the first mold member toward the open position to partially open the mold as the moldable material cures to reduce forces imparted upon the mold due to expansion of the moldable material during curing;
placing the pipe within the mold cavity;
filling the annular portion of the mold cavity with the moldable material so that the mold cavity fills from a bottom toward a top of the mold cavity; and
during said step of filling the mold cavity, venting air displaced by moldable material in the mold cavity radially outwardly from the mold at plural locations along the longitudinal axis of the mold through the elongate vent.

15. The method as set forth in claim 14 further comprising closing the mold after placing the pipe within the mold, said step of closing the mold comprising positioning the elongate vent adjacent the top of the mold cavity.

16. The method as set forth in claim 15 wherein the step of closing the mold comprises moving the first elongate mold member relative to the second elongate mold member to position a parting face of each of the first and second elongate mold members in opposing spaced apart relationship with one another to define the elongate vent.

17. The method as set forth in claim 16 wherein the step of closing the mold comprises pivoting the first elongate mold member about a pivot axis oriented generally horizontally.

18. The method as set forth in claim 16 wherein the step of closing the mold comprises moving each of the first and second elongate mold members relative to a bottom elongate mold member.

19. The method as set forth in claim 14 wherein the step of venting air comprises venting air from the annular portion along a length of the elongate vent that is at least about 45 feet.

20. A molding system for applying a moldable material to a pipe, the molding system comprising:
a mold having first and second end portions spaced apart along a longitudinal axis of the mold, the mold defining a mold cavity for receiving the pipe therein so that the pipe extends generally along the longitudinal axis of the mold, the mold having an open position in which the mold cavity is open for passing the pipe into and out of the mold cavity, and a closed position in which the pipe cannot pass into or out of the mold cavity;
a support configured to hold the pipe in the mold cavity so that an annular portion of the mold cavity extends circumferentially around the pipe in the closed position of the mold;
wherein the mold defines one or more openings in communication with the annular portion of the mold in the closed position, the one or more openings being configured to at least one of (i) provide fluid communication between the mold cavity and the atmosphere outside of the mold so that air in the mold cavity displaced by moldable material received into the mold cavity vents along the longitudinal axis of the mold and (ii) receive a portion of the moldable material that forms flashing along the length of the mold;
wherein the mold comprises first and second elongate mold members, the first mold member being movable relative to the second mold member to an open member position corresponding to the open position of the mold and a closed member position corresponding to the closed position of the mold, the molding system further comprising:
a positioner operatively connected to the first mold member to move the first mold member between the open member position and the closed member position; and
a controller configured to control the positioner to:
position the first mold member in the closed position while the mold is filled with the moldable material and
move the first mold member toward the open position to partially open the mold as the moldable material cures to reduce forces imparted upon the mold due to expansion of the moldable material during curing.

21. The molding system as set forth in claim 20 wherein the controller is configured to prevent the positioner from partially opening the mold until the moldable material has at least partially solidified.

22. The molding system as set forth in claim 21 wherein the controller is configured to direct the positioner to partially open the mold before the moldable material has fully expanded during curing.

23. The molding system as set forth in claim 20 wherein the positioner comprises a cylinder and a piston slidably received in the cylinder for movement relative to the cylinder to drive movement of the first mold member.

24. The molding system as set forth in claim 23 wherein the positioner is fluidly connected to a reservoir of charged nitrogen.

25. The molding system as set forth in claim 20 wherein the positioner is configured to pivot the first elongate mold member about a pivot axis relative to the second elongate mold member.

26. The molding system as set forth in claim 20 wherein the mold comprises an elongate bottom mold member and the first and second elongate mold members are pivotably connected to the elongate bottom mold member.

27. The molding system as set forth in claim 26 wherein the positioner is a first positioner and the molding system further comprises a second positioner, the first positioner being operatively connected between the first elongate mold member and the elongate bottom mold member to selectively pivot the first elongate mold member between the open and closed positions and the second positioner being operatively connected between the second elongate mold member and the elongate bottom mold member to selectively pivot the second elongate mold member between an open position and a closed position.

* * * * *